US006613486B1

(12) United States Patent
Ohtsu et al.

(10) Patent No.: US 6,613,486 B1
(45) Date of Patent: Sep. 2, 2003

(54) METHOD FOR PRODUCING COLOR FILTER USING PHOTOCATALYSIS, APPARATUS FOR PRODUCING COLOR FILTER

(75) Inventors: Shigemi Ohtsu, Nakai-machi (JP); Takao Tomono, Nakai-machi (JP); Keishi Shimizu, Nakai-machi (JP); Eiichi Akutsu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 200 days.

(21) Appl. No.: 09/656,443

(22) Filed: Sep. 6, 2000

(30) Foreign Application Priority Data

Nov. 12, 1999 (JP) .......................................... 11-322507

(51) Int. Cl.[7] .......................... G02B 5/20; G02F 1/1335
(52) U.S. Cl. ....................... 430/7; 422/186.3; 349/106; 205/91
(58) Field of Search ............................... 430/7; 205/91; 349/106; 422/186.3

(56) References Cited

U.S. PATENT DOCUMENTS 6,294,313 B1 * 9/2001 Kobayashi et al. ......... 430/302

FOREIGN PATENT DOCUMENTS

| JP | A 59-90818 | 5/1984 |
| JP | A 60-23834 | 2/1985 |
| JP | A 2-24603 | 1/1990 |
| JP | A 5-5874 | 1/1993 |
| JP | 11-133224 A | * 5/1999 |

OTHER PUBLICATIONS

Hoshino et al., "Patterned Pigment Film Formation by Photocatalytic Desposition Method—Effect of Application of Bias Voltage on Film Formation—," *Journal of the Society of Photographic Science and Technology of Japan*, vol. 59, No. 2, 1996, pp. 340–345.

* cited by examiner

*Primary Examiner*—John A. McPherson
(74) *Attorney, Agent, or Firm*—Oliff & Berridge, PLC

(57) ABSTRACT

The present invention provides a film-making method, wherein a film-making substrate having a light-transmittable substrate which supports a light-transmittable conductive thin film and a photocatalytic thin film is immersed in an electrolytic solution and irradiated with ultraviolet light directed onto the photocatalytic thin film to form a film thereon, the conductive film and photocatalytic film being arranged on the film-making substrate in such a way that they are in contact with each other, that the conductive film is allowed to conduct to the electrolytic solution and that the photocatalytic film comes into contact with the electrolytic solution, and the electrolytic solution containing a substance which decreases in solubility or dispersibility in an aqueous liquid when its pH is changed.

41 Claims, 8 Drawing Sheets

42 Photocatalytic thin film

METHOD FOR PRODUCING COLOR FILTER USING PHOTOCATALYSIS, APPARATUS FOR PRODUCING COLOR FILTER

BACKGROUND OF THE INVENTION

1. Field of the Invention

The present invention relates to a method for forming a color filter for CCD cameras, various display devices (e.g., liquid-crystal display devices) and color sensors and a method for forming a colored layer or a black matrix and in particularly relates to a novel method for producing a colored layer and black matrix simply and with high resolution.

2. Discussion of the Related Art

At present, color filters are produced by various methods, e.g., (1) dyeing, (2) pigment dispersion, (3) printing, (4) ink jet, (5) electrodeposition, and (6) micelle electrolysis.

Of these, the methods (1) dyeing and (2) pigment dispersion have been highly developed technically, and widely used for producing color charge-coupled devices (CCDs). One of the major disadvantages involved in these methods is high cost resulting from a number of steps required, e.g., photolithography followed by patterning.

By contrast, the methods (3) printing and (4) ink jet, although needing no photolithography step, have their own disadvantages. For example, the method (3), hardening printed thermosetting resin dispersed with a pigment, gives the product low in resolution and uniformity of thickness. The method (4), treating a specific ink-receiving layer to make it partly hydrophilic and partly hydrophobic, and spraying an ink onto the hydrophilic portion to produce a color filter layer, gives the product low in resolution and positioning accuracy, because of high probability of causing color contamination of the adjacent filter layer.

The method (5) electrodeposition applies a high voltage of around 70 V to a patterned transparent electrode in an electrolytic solution dispersed with a pigment of water-soluble polymer, to form an electrodeposited film for coating. This procedure is repeated 3 times, to obtain a color filter of R.G.B. This method needs the transparent electrode for electrodeposition, which is patterned beforehand by photolithography, and is inapplicable to TFT liquid-crystals because of limited pattern shape. No patterning step may be necessary to effect anew, if the color filter can be monolithically formed by electrodeposition with pixel electrodes on a TFT liquid-crystal substrate. The conventional electrodeposition method, however, needs electrodeposition voltage which is too high to trigger electrodeposition by an active matrix circuit on the transparent pixel electrodes. It is therefore inapplicable to electrodeposition in which a pixel electrode of TFT is used.

The method (6) micelle electrolysis is one type of electrodeposition, which utilizes the redox reaction of ferrocene as the separating material to reduce voltage for electrodeposition, and is applicable to formation of a color filter monolithically with pixel electrodes on a TFT liquid-crystal substrate. However, a TFT to which a voltage can be applied is difficult to pass a large current, because of its high internal resistance. It is therefore difficult even for micelle electrolysis to directly form a color filter on pixel electrodes using a driving circuit for TFT. Moreover, the thin film formed by micelle electrolysis tends to be contaminated with ferrocene, surfactant or the like essential for the forming process, which separate out and are included in the film as impurities, to deteriorate its transparency. Its another disadvantage is high cost, resulting from long electrodeposition time required (several ten minutes) to decrease production efficiency, and use of a high-priced ferrocene compound as the essential electrolytic solution component. In addition, it needs an alkali metal as the prerequisite supporting salt, which may adversely affect the TFT circuit and liquid crystal, making this method inapplicable.

Japanese Patent Laid-Open No. 5-5874 (1993) discloses a method for monolithically forming a color filter on a TFT substrate, which uses a TFT-driving circuit to form a color filter layer of specific color on selected pixels by electrodeposition. This method, therefore, needs an electrodeposition apparatus and special considerations, e.g., use of separate electrodes to compensate for very high internal resistance of a TFT and secure current and voltage required for forming the film by electrodeposition. It is also necessary to protect the TFT circuit from the alkali metal present in the film, which needs to keep the solution high in conductivity for electrodeposition. This, in turn, needs a supporting salt for the solution, which is one of the causes for contamination with impurities. At the same time, a TFT of low internal resistance is needed to transmit a large current, because the conventional TFT-driving circuit is unsuitable for direct electrodeposition on pixel electrodes. The conventional electrodeposition process, involving these technical problems, is difficult to apply to production of color filters using a TFT-driving circuit. As a result, a liquid-crystal display device in which a color filter substrate and TFT substrate are monolithically formed has not been commercialized.

The photocatalytic deposition method, developed by Hoshino et. al. of Chiba University, is known as one type of micelle electrolysis in which photoreactions are used for film-making. This method is described in detail by Hoshino, Katoh, Kurasako and Komon in J. of Photography Society of Japan, vol. 59, No. 2 (1996). It uses the redox reactions of ferrocene to form a film on a section not irradiated with light, and needs an external voltage, complicating the production apparatus. It is therefore unsuitable for forming fine patterns for, e.g., color filters.

It is an object of the present invention to provide a film-making method capable of forming films by a simple process. It is another object of the present invention to provide a method for forming color filters of high numerical aperture and resolution in a well controlled manner, simply and at low cost using the above method. It is still another object of the present invention to provide an electrolytic solution for forming color filters, simple film-making apparatus which needs no electrodeposition apparatus or separate electrode for electrodeposition, and apparatus for producing a color filter.

Japanese Patent Laid-Open No. 59-90818 (1984) discloses a method for forming color filters, in which an electrode of conductive transparent thin film, divided into 2 or more regions, is formed on a transparent substrate, and electrodeposition coating is repeated by applying a voltage to a selected electrode, to coat the electrodes with different colors. It describes that the color filter is applicable to a switching device of, e.g., TFT. Japanese Patent Laid-Open No. 60-23834 discloses a method for forming a matrix type multi-color display, provided with thin-film transistor arrays formed at intersections of gate lines and source lines running perpendicularly to each other; substrate comprising display electrodes each having a color filter of its own color, and connected to drains of the thin-film transistor; and the opposite substrate with an electrical conductor over the entire surface, with a display material sandwiched by the transistor arrays and transparent conductor, characterized in that the color filters and conductive sections on the transistor arrays are used as the electrodes for electrodeposition, and colored films are selectively formed on the conductive sections by repeated electrodeposition with the solution dissolving, or dispersed with, at least an electrodepositing polymer and pigment. Japanese Patent Laid-Open No. 2-24603 discloses a method for forming a color filter, with transparent electrodes formed in a given pattern on a transparent substrate and an organic pigment layer on each transparent electrode, which is obtained by immersing the substrate and electrodes for energizing in a solution with a water-insoluble organic pigment solubilized in an aqueous micelle solution of a surfactant; and forming a given pattern of the transparent electrodes by passing electricity between the electrodes for energizing to effect the electrode-aided oxidation of the micelle on the transparent electrode to deposit the organic pigment molecules thereon, these steps being repeated at least once with an organic pigment of different spectral characteristics and another pattern of the transparent electrodes.

SUMMARY OF THE INVENTION

The present invention has been made in view of the above circumstances and provides the following film-making method, method for forming color filters, electrolytic solution, film-making apparatus, and apparatus for producing a color filter.

(1) A film-making method, wherein a film-making substrate comprising a light-transmittable substrate which supports a light-transmittable conductive thin film and a photocatalytic thin film is immersed in an electrolytic solution and irradiated with ultraviolet light directed onto the photocatalytic thin film to form a film thereon, the conductive film and the photocatalytic film being arranged on the film-making substrate in such a way that they are in contact with each other, that the conductive film is allowed to conduct to the electrolytic solution and that the photocatalytic film comes into contact with the electrolytic solution, and the electrolytic solution containing a substance which decreases in solubility or dispersibility in an aqueous liquid when its pH is changed.

The film-making method of the present invention needs neither electrodeposition apparatus nor separate electrode for electrodeposition, and hence gives a film by a simple apparatus and at a low cost. The film prepared by this method is of high quality, on a level with the one prepared by photoelectrodeposition in quality, and uniformity because no external voltage is applied during the process of making colored films.

(2) The film-making method according to (1), wherein the photocatalytic thin film is provided on the film-making substrate in such a way that the conductive thin film is partly exposed, to allow the conductive film to conduct to the electrolytic solution, when it comes into contact with the solution.

(3) The film-making method according to (1), wherein the conductive thin film is connected to an electrode on the film-making substrate, and the electrode is brought into contact with the electrolytic solution, to allow the conductive film to conduct to the electrolytic solution.

(4) A method for producing a color filter, comprising a step of irradiating a color filter producing substrate, immersed in an electrolytic solution, with ultraviolet light, wherein said substrate comprises a light-transmittable substrate which supports a light-transmittable conductive thin film and a photocatalytic thin film in such a way that they are in contact with each other, that the conductive film is allowed to conduct to the electrolytic solution and that the photocatalytic film comes into contact with the electrolytic solution, the electrolytic solution containing a substance which decreases in solubility or dispersibility in an aqueous liquid when its pH is changed, and the ultraviolet light being directed-onto a selected region on the photocatalytic film to form a colored film thereon.

The method of the present invention for producing a color filter, using the above-described film-making method (1), can give a color filter of high numerical aperture and resolution at a low cost. Therefore, use of the color filter of the present invention allows producing a liquid-crystal display device of high accuracy at a low cost.

(5) A method for producing a color filter, comprising a step of irradiating a color filter producing substrate, immersed in an electrolytic solution, with ultraviolet light, wherein the substrate comprises a light-transmittable substrate which supports a light-transmittable conductive thin film and a photocatalytic thin film in such a way that they are in contact with each other, that the conductive film is allowed to conduct to the electrolytic solution and that the photocatalytic film comes into contact with the electrolytic solution, the electrolytic solution containing a substance which decreases in solubility or dispersibility in an aqueous liquid when its pH is changed, and the ultraviolet light being directed onto a selected region on the photocatalytic film to form a colored film thereon, the above step being repeated once or more after changing a colorant each time for the electrolytic solution.

(6) The method for producing a color filter according to (4) or (5), wherein the photocatalytic thin film is provided on the color filter producing substrate in such a way that the conductive thin film is partly exposed, to allow the conductive film to conduct to the electrolytic solution, when it comes into contact with the solution.

(7) The method for producing a color filter according to (4), wherein the conductive thin film is connected to an electrode on the color filter producing substrate, and the electrode is brought into contact with the electrolytic solution, to allow the conductive film to conduct to the electrolytic solution.

(8) The method for producing a color filter according to (4), wherein the conductive thin film and photocatalytic thin film are formed in a pattern corresponding to that of the pixels of the color filter.

(9) A method for producing thin-film transistor type color filters, comprising a step of irradiating a color filter producing substrate, immersed in an electrolytic solution, with ultraviolet light, wherein the substrate comprises a light-transmittable substrate which supports a thin-film transistor, light-transmittable pixel electrodes, and photocatalytic thin film, arranged in such a way that the photocatalytic thin film is in contact with the electrodes while partly exposing them, and that at least the electrodes and photocatalytic film come into contact with the electrolytic solution, the electrolytic solution containing a colorant and substance which decreases in solubility or dispersibility in an aqueous liquid when its pH is changed, and the ultraviolet light being directed onto a selected region on the photocatalytic film to form a colored film thereon.

The method of the present invention for producing a TFT-assembled color filter, forming the color filter and TFT as a monolithic structure, can give a color filter of high numerical aperture and resolution at a low cost, and, at the same time, dispense with the step for aligning the color filter with the TFT, which is needed by the conventional method. Therefore, use of the color filter of the present invention allows producing a liquid-crystal display device of high accuracy at a low cost.

(10) A method for producing thin-film transistor type color filters, comprising a step of irradiating a color filter producing substrate, immersed in an electrolytic solution, with ultraviolet light, wherein the substrate comprises a light-transmittable substrate which supports a thin-film transistor, light-transmittable pixel electrodes, and photocatalytic thin film, arranged in such a way that the photocatalytic thin film is in contact with the electrodes while partly exposing them, and that at least the electrodes and photocatalytic film come into contact with the electrolytic solution, the electrolytic solution containing a colorant and substance which decreases in solubility or dispersibility in an aqueous liquid when its pH is changed, and the ultraviolet light being directed onto a selected region on the photocatalytic film to form a colored film thereon, the above step being repeated once or more after changing the colorant each time for the electrolytic solution.

(11) The method for producing a color filter according to (4), wherein the ultraviolet light is directed onto the selected region through a photomask.

(12) The method for producing a color filter according to (4), wherein an image-focusing optical system is put between a photomask and the color filter producing substrate, to form an image of ultraviolet light on the photocatalytic thin film.

(13) The method for producing a color filter according to (4), wherein the image-focusing optical lens of the image-focusing optical system and light-transmittable substrate are set 1 mm to 50 cm apart from each other.

(14) The method for producing a color filter according to (4), wherein the image-focusing optical system has a focal depth of ±10 to ±100 μm.

(15) The method for producing a color filter according to (4), wherein a mirror reflection optical system is put between a photomask and the color filter producing substrate, to form an image of ultraviolet light on the photocatalytic thin film.

(16) The method for producing a color filter according to (4), wherein the photocatalytic thin film contains titanium oxide.

(17) The method for producing a color filter according to (4), wherein the substance which decreases in solubility or dispersibility in an aqueous liquid when its pH is changed has carboxyl group in its molecule.

(18) The method for producing a color filter according to (4), wherein the substance which decreases in solubility or dispersibility in an aqueous liquid when its pH is changed is a polymer.

(19) The method for producing a color filter according to (4), wherein the polymer is a copolymer of monomers having a hydrophobic and hydrophilic group, respectively, number of the hydrophobic group accounting for 40% or more but 80% or less of the total number of the hydrophobic and hydrophilic groups.

(20) The method for producing a color filter according to (4), wherein pH level of the electrolytic solution is adjusted by a pH adjustor which has no adverse effect on the film-making characteristics.

(21) The method for producing a color filter according to (4), wherein conductivity of the electrolytic solution is adjusted by a salt which has no adverse effect on the film-making characteristics.

(22) The method for producing a color filter according to (4), wherein temperature of the electrolytic solution is controlled.

(23) The method for producing a color filter according to (4), wherein the electrolytic solution contains fine particles of a light-transmittable, conductive substance.

(24) The method for producing a color filter according to (4), wherein a black matrix is formed by photolithography which uses a black photoresist, before the colored film is formed.

(25) The method for producing a color filter according to (4), wherein after forming the colored film, a surface on which the colored film is formed coated with a black, UV-settable resin, the light-transmittable substrate is irradiated with ultraviolet light from the side opposite to the colored film, and the portion which is not set is removed, to form a black matrix.

(26) A method for producing thin-film transistor type color filters, comprising steps of forming a color filter producing substrate provided with black matrix by coating a thin-film transistor and light-transmittable pixel electrodes, supported by a light-transmittable substrate, with a black, positive photoresist; irradiating the substrate with light from the side opposite to the thin-film transistor and light-transmittable pixel electrodes; removing the positive photoresist irradiated with light; and providing the color filter producing substrate with a photocatalytic thin film, in such a way that the photocatalytic thin film is in contact with the electrodes while partly exposing them;

immersing the color filter producing substrate in an electrolytic solution containing a colorant and substance which decreases in solubility or dispersibility in an aqueous liquid when its pH is changed, in such a way that at least the electrodes and photocatalytic film come into contact with the electrolytic solution;

irradiating the color filter producing substrate with ultraviolet light onto a selected region on said photocatalytic film to form a colored film thereon; and repeating the above steps twice or more after changing the colorant each time for the electrolytic solution.

(27) The method for producing a color filter according to (9), wherein each of the gate and drain electrodes of the thin-film transistor is made of a low reflection material, and provided with functions similar to those of the black matrix.

(28) The method for producing a color filter according to (27), wherein each of the gate and drain electrodes is composed of two- or three-layered Cr.

(29) The method for producing a color filter according to (9), wherein a light-transmittable conductive thin film is formed on the colored film in such a way to conduct to the pixel electrodes.

(30) An electrolytic solution to be used for producing the color filter according to (4), characterized by containing a colorant and substance which decreases in solubility or dispersibility in an aqueous liquid when its pH is changed.

(31) The electrolytic solution according to (30), wherein the substance which decreases in solubility or dispersibility in an aqueous liquid when its pH is changed is a polymer having carboxyl group, and the colorant is a pigment.

(32) The electrolytic solution according to (30), wherein the polymer is a copolymer of a monomer having a hydrophobic group and a monomer having a hydrophilic group, respectively, the number of the hydrophobic groups accounting for 40% or more but 80% or less of the total number of the hydrophobic and hydrophilic groups.

(33) A film-making method, wherein a film-making substrate comprising a light-transmittable substrate which supports a light-transmittable conductive thin film and a photocatalytic thin film is immersed in an electrolytic solution, and irradiated with ultraviolet light directed onto the photocatalytic thin film to form a film thereon, the conductive film and photocatalytic thin film are arranged in such a way that they are in contact with each other, that the conductive film is allowed to conduct to the electrolytic solution and that the photocatalytic film comes into contact with the electrolytic solution, and the electrolytic solution containing a substance which can be made into film by photocatalytic reactions.

(34) A method for producing a color filter, comprising a step of irradiating a color filter producing substrate, immersed in an electrolytic solution, with ultraviolet light, wherein the substrate comprises a light-transmittable substrate which supports a light-transmittable conductive thin film and a photocatalytic thin film in such a way that they are in contact with each other, that the conductive film is allowed to conduct to the electrolytic solution and that the photocatalytic film comes into contact with the electrolytic solution, the electrolytic solution containing a colorant and a substance which can be made into film by photocatalytic reactions, and the ultraviolet light being directed onto a selected region on the photocatalytic film to form a colored film thereon.

(35) A film-making apparatus, equipped with a light source which emits ultraviolet light, image-focusing optical system having a first image-focusing optical lens and second image-focusing optical lens, photomask put between the first and second image-focusing optical lenses, and electrolysis tank containing an electrolytic solution, wherein a film-making substrate is placed in the electrolysis tank, the film-making substrate comprising a light-transmittable substrate which supports a light-transmittable conductive thin film and photocatalytic thin film in such a way that they are in contact with each other, and that the conductive film is allowed to conduct to the electrolytic solution.

The film-making apparatus of the present invention needs neither electrodeposition apparatus nor separate electrode for electrodeposition, and hence can be simply structured.

(36) The film-making apparatus according to (35), wherein the image-focusing optical system is replaced by a mirror reflection optical system.

(37) An apparatus for producing a color filter, equipped with a light source which emits ultraviolet light, image-focusing optical system having a first image-focusing optical lens and second image-focusing optical lens, photomask put between the first and second image-focusing optical lenses, and electrolysis tank containing an electrolytic solution, wherein a color filter producing substrate, comprising a light-transmittable substrate which supports a thin-film transistor, light-transmittable pixel electrodes and photocatalytic thin film, is placed in the electrolysis tank in such a way that at least the electrodes and photocatalytic film come into contact with the electrolytic solution, the photocatalytic thin film being arranged in such a way that it is in contact with the electrodes while partly exposing them.

The apparatus of the present invention for producing a color filter needs neither electrodeposition apparatus nor separate electrode for electrodeposition, and hence can be simply structured.

(38) The apparatus for producing a color filter according to (37), wherein the image-focusing optical system is replaced by a mirror reflection optical system.

(39) A color filter, comprising a light-transmittable substrate which supports a light-transmittable conductive thin film, colored film and a photocatalytic thin film, wherein the photocatalytic thin film is arranged in such a way that it is in contact with the conductive film while partly exposing it, and the colored film is formed on the photocatalytic thin film.

(40) A liquid-crystal display, at least equipped with the color filter according to (39), a substrate facing the color filter, supporting a thin-film transistor and pixel electrodes, and liquid-crystalline substance sealed between the color filter and substrate.

BRIEF DESCRIPTION OF THE DRAWINGS

Preferred embodiments of the present invention will be described in detail based on the following figures, wherein.

DETAILED DESCRIPTION OF THE PREFERRED EMBODIMENT(S)

Figure 1:
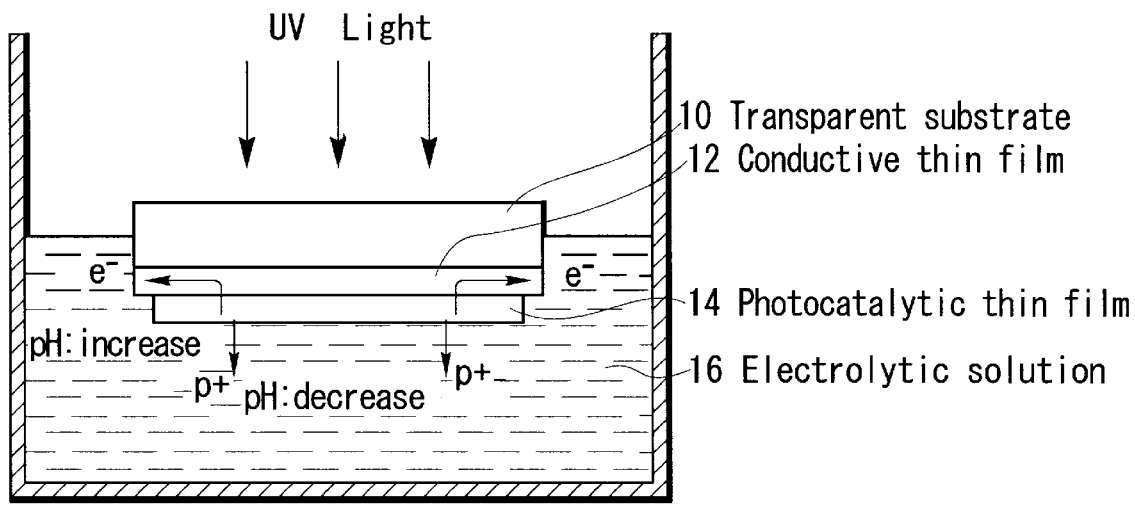
FIG. 1 shows the concept of the principle of the film-making method of the present invention, based on the photocatalytic reaction.

The inventors of the present invention have reviewed principles of the electrodeposition techniques themselves to form colored films, e.g., color filters, and proposed the so-called "photoelectrodeposition method," noting compounds whose solubility in water greatly varies depending on hydrogen ion concentration of the solution. This photo-electrodeposition method brings a photosemiconductor as the work electrode into contact with a solution containing a substance which decreases in solubility or dispersibility in an aqueous liquid when its pH is changed; and irradiates the work electrode with light while a voltage (bias voltage) is applied between it and the opposite electrode, to electrically deposit the above substance on the light-irradiated portion. When the sum of photoelectromotive force and bias voltage exceeds the threshold voltage at which electrolysis of water is triggered, the solution decreases in pH level in the vicinity of the work electrode, this change in pH level decreasing solubility of the above substance, to deposit it as a film on the work electrode surface.

The substance which decreases in solubility or dispersibility in an aqueous liquid when its pH is changed is described, taking a water-soluble acrylic resin having carboxyl group as the example. It is readily soluble in weakly alkaline water (pH: 8 to 9), and present as the anion in the solution. It is insolubilized when its pH decreases to 7 or less, separating out of the solution. When current is passed between platinum electrodes immersed in the above solution, the OH ion in the aqueous solution is consumed in the vicinity of the anode into $O_2$, increasing hydrogen ion concentration of the solution to decrease its pH level. This results from the reaction between the hole (p) and $OH^-$ ion in the vicinity of the anode:

$2OH^- + 2p^+ \rightarrow \frac{1}{2}(O_2) + H_2O$

This reaction needs a certain voltage to occur.

In the above-described photoelectrodeposition method, the above reaction occurs, when the sum of photoelectromotive force and bias voltage exceeds the threshold voltage at which electrolysis of water is triggered, to increase hydrogen ion concentration of the solution as the reaction proceeds, decreasing its pH level. As a result, the water-soluble acrylic resin is insolubilized in the vicinity of the photosemiconductor (work electrode), because of its decreased solubility, to be deposited as a thin film on the electrode.

The inventors of the present invention have found that pH (hydrogen ion concentration) of the solution in the vicinity of the thin film of photosemiconductor can be varied without using photoelectromotive force. Concretely, the photocatalytic effect of a photosemiconductor, e.g., titanium oxide, can be used to trigger electrolysis of water in the solution in contact with titanium oxide, when it is merely irradiated with light, to change hydrogen ion concentration. Unlike the conventional photoelectrodeposition, it needs no electricity supplied from the outside. Therefore, this new method can change hydrogen ion concentration of the solution coming into contact with titanium oxide, without needing external electricity, to separate the substance out of the solution and deposit it in a thin film.

For electrolysis of water, the famous phenomenon referred to as the Fujishima-Honda effect. It is a phenomenon, in which titanium oxide, when irradiated with ultraviolet light, shows the photocatalytic effect to electrolyze water in its vicinity and produce hydrogen. The typical techniques which apply the photocatalytic reactions are described in detail in "$TiO_2$ Photocatalysis; its application to self-cleaning, anti-bacterial and air purifying materials" by Hashimoto and Fujishima, CMC, 1998.

However, no technique has been developed so far to apply the photocatalytic reactions to formation of a thin film. The Fujishima-Honda effect, in which water is electrolyzed photocatalytically to generate hydrogen, causes no change in hydrogen ion concentration of the aqueous solution, because the oxidation and reduction simultaneously proceed in this phenomenon, leaving the hydrogen ion concentration unchanged as a whole. Therefore, it is not considered as a phenomenon useful for formation of a thin film.

The photocatalysis-aided film-making method of the present invention is based on the finding that hydrogen ion concentration can be changed in the vicinity of the photocatalysis surface, when either the above-described oxidation or reduction is triggered over the surface.

More concretely, the novel film-making method of the present invention is characterized in that a film-making substrate comprising a light-transmittable substrate (hereinafter sometimes referred to merely as "transparent substrate") which supports a light-transmittable conductive thin film (hereinafter sometimes referred to merely as "thin, conductive film") and photocatalytic thin film is immersed in an electrolytic solution and irradiated with ultraviolet light directed onto the photocatalytic thin film, wherein the conductive film and photocatalytic film are arranged on the film-making substrate in such a way that they are in contact with each other, that the conductive film is allowed to conduct to the electrolytic solution and that the photocatalytic film comes into contact with the electrolytic solution, and the electrolytic solution contains a substance which decreases in solubility or dispersibility in an aqueous liquid when its pH is changed. The reaction similar to that shown above can proceed over the photocatalytic thin film, without needing an external voltage, when it is irradiated with ultraviolet light, to decrease pH of the electrolytic solution in the vicinity of the photocatalytic film surface. This decreases solubility of the film-making substance in the electrolytic solution as pH decreases, allowing it to be separated out on the photocatalytic thin film.

The film-making substrate in which an conductive film is allowed to conduct to the electrolytic solution "conductive film allowed to conduct to the electrolytic solution" can be realized directly or indirectly by bringing the conductive thin film into contact with the electrolytic solution after arranging the photocatalytic thin film on the film-making substrate in such a way to partly expose the conductive film, or by bringing an electrode into contact with the electrolytic solution after connecting the conductive thin film on the substrate to the electrode via a lead wire, to form an internal circuit among the photocatalytic thin film, conductive thin film and electrolytic solution, as described later.

The photocatalysis-aided film-making method of the present invention is described by referring to the drawings. FIG. 1 shows concept of the principle of the film-making method of the present invention, based on the photocatalytic reaction, wherein reference numeral 10 denotes a transparent substrate, reference numeral 12 for a conductive thin film, reference numeral 14 for a thin film of a substance showing the photocatalytic function (thin, photocatalytic film), and reference numeral 16 for an electrolytic solution. The photocatalytic thin film is arranged on the transparent substrate in such a way to partly expose the conductive thin film. The electrolytic solution 16 contains a substance which decreases in solubility or dispersibility in an aqueous liquid when its pH is changed. In this example, it is necessary to arrange the substrate in such a way that at least both the conductive thin film 12 and photocatalytic thin film 14 come into contact with the electrolytic solution. This arrangement triggers electrolysis of water without needing external voltage, when the photocatalytic film 14 is irradiated with ultraviolet light, because the internal circuit is formed between the photocatalytic film 14 and conductive film 12. In this internal circuit, the photocatalytic film serves as the work electrode, and the conductive film as the opposite electrode.

The holes and electrons are generated as a result of light irradiation, and move into the aqueous solution, the former via the photocatalytic film 14 and the latter via the conductive film 12. This triggers electrolysis of water, decreasing pH of the solution in the vicinity of the photocatalytic film and increasing it in the vicinity of the opposite electrode. The substance decreasing in solubility with decreased pH is deposited on the photocatalytic film.

The conductive thin film coming into contact with the electrolytic solution means that at least part of the film is in contact with the solution, which should include the case where only side of the film is in contact with the solution.

Figure 2:
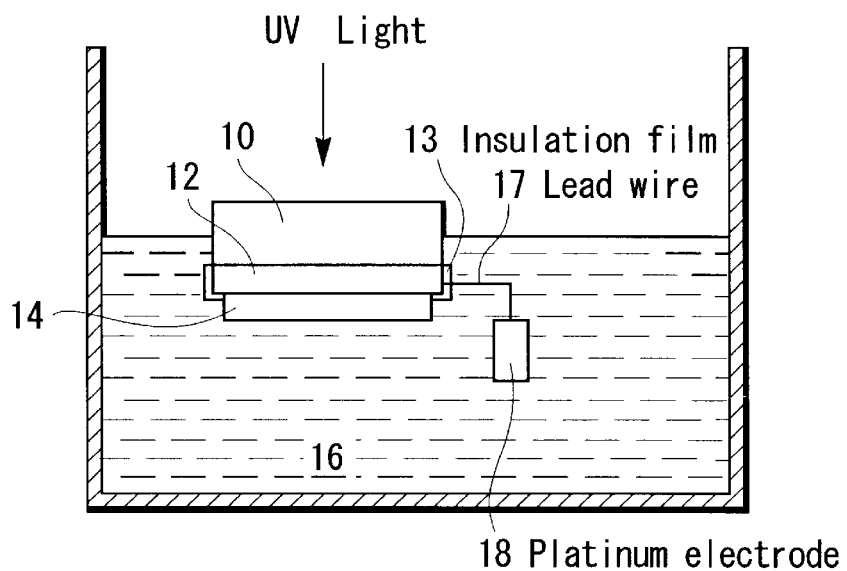
FIG. 2 shows the film-making method, wherein the conductive thin film is connected to the electrode in the electrolytic solution via a lead wire, after the conductive film is electrically insulated.

FIG. 2 shows concept of the film-making method of the present invention, wherein the conductive thin film is not in direct contact with the electrolytic solution. As shown in this figure, the portion of the conductive thin film which is not covered with the photocatalytic thin film is covered with an insulation film, and the conductive film is connected to the electrode, e.g., platinum electrode 18, in the electrolytic solution via a lead wire 17. In this example, the internal circuit similar to the above-described one is formed, decreasing pH of the solution in the vicinity of the photocatalytic thin film surface, while increasing pH of the solution in the vicinity of the platinum electrode.

Figure 3:
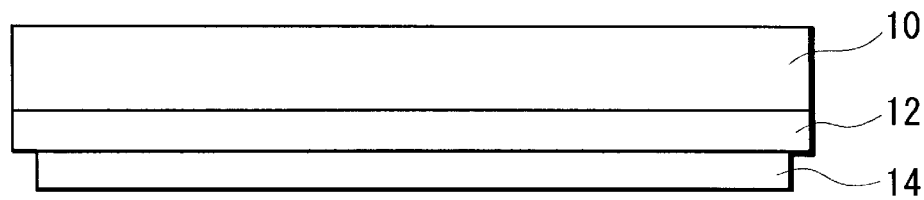
FIG. 3 shows one example of film-making substrate (for producing a color filter), comprising a transparent substrate, conductive thin film and photocatalytic thin film.
Figure 4:
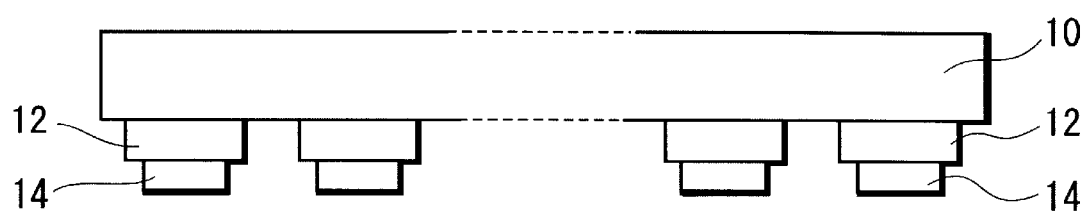
FIG. 4 shows another example of film-making substrate.

FIG. 3 shows one example of arrangement of the conductive thin film 12 and photocatalytic thin film 14, which are extended over the entire surface of the substrate (wherein, the conductive thin film is partly exposed, but can be totally covered with the photocatalytic thin film or photocatalytic film and an insulating coating film, as described above). FIG. 4 shows another arrangement, wherein the conductive thin film 12 is formed in a pattern, and the photocatalytic thin film 14 is provided for each conductive film division 12. This arrangement can be used to form a color filter, wherein the conductive thin film and photocatalytic thin film are arranged in a pattern corresponding to that of the color filter's pixels. When they are arranged in a pixel pattern, it is essential that the conductive thin film is partly exposed, as shown in FIG. 4.

The film-making method of the present invention needs neither electrodeposition apparatus nor separate electrode for electrodeposition, and hence gives a film by a simple apparatus and at a low cost. The film prepared by this method is of high quality, on a level with the one prepared by photoelectrodeposition in quality, and uniformity because no external voltage is applied during the process of making colored films.

Next, the light-transmittable substrate, light-transmittable conductive thin film, and photocatalytic thin film for the film-making substrate or color filter producing substrate, useful for the present invention, are described in this order.

The light-transmittable substrate for the present invention is the one which transmits light in the visible region. The substrates useful for the present invention include glass plate, and plates, sheets or films of polyethylene terephthalate, polyethylene naphthalate, polyether sulfone, polyether imide, polyether ketone, polyphenylene sulfide, polyallylate, polyimide and polycarbonate.

The light-transmittable conductive thin film to be formed on the light-transmittable substrate serves as the opposite electrode to the photocatalytic thin film as the work electrode for the film-making method of the present invention. The conductive films useful for the present invention include those of ITO, tin dioxide and indium oxide.

Titanium oxide is preferably used as the photocatalysis. Titanium oxide is preferably of anatase for its photocatalytic function, but rutile is acceptable.

Several methods are known for producing titanium oxide films. For example, thermal oxidation, sputtering, electron beam (EB) and sol-gel methods are well known. The titanium oxide film produced by the conventional sputtering or EB method is not sufficient in photocatalytic effect. It is recommended to treat titanium oxide by reduction, to enhance its photocatalytic effect, in a hydrogen atmosphere at elevated temperature. It will have the sufficient effect, when treated at low temperature, e.g., around 330° C. for a short time of 10 min., in a nitrogen gas containing 3% of hydrogen, flowing at 1 L/min.

When the film-making method of the present invention is applied to a substrate which supports a thin-film transistor (TFT) device, the characteristics of TFT limit temperature to which the substrate can be heated to 250° C. or so excludes use of the sol-gel method, because it needs sintering at around 500° C. Therefore, the methods which can give a titanium oxide thin film at lower temperature are used for the above purpose. They include sputtering, electron beam heating, and use of a coating solution, dispersed with fine particles of photocatalytic titanium oxide (such a solution is supplied by TOTO or Nippon Soda).

The photocatalytic thin film is 0.05 to 3 $\mu$m thick, for good photocatalytic characteristics. It is insufficient in light absorptivity at a thickness below 0.05 $\mu$m. At above 3 $\mu$m, on the other hand, the film-making characteristics may be deteriorated, e.g., the film tends to be cracked. It is therefore recommended that the film thickness is in the above range.

Next, the electrolytic solution for the film-making method of the present invention is described. It is essential for the electrolytic solution for the present invention contains a substance which decreases in solubility or dispersibility in an aqueous liquid when its pH is changed. Such a substance is preferably the one having a group (ionic group, e.g., carboxyl or amino) in a molecule, which changes in its ion dissociation in a solution when its pH is changed. For example, all of the substances which the inventors of the present invention proposed before as the ones decreasing in solubility or dispersibility in an aqueous liquid when its pH is changed can be basically used.

However, the presence of an ionic group is not necessarily essential for the film-making substance. Polarity of the ion is not limited. For example, consider a mixture of two types of ionic species. When a basic solution is neutralized with an acidic solution, the product, e.g., a complex, generally separates out and is precipitated. Therefore, when two types of pigments are mixed with each other to produce a mixed color, it is a normal practice to use non-polar pigments, or disperse a pigment with another of the same polarity. However, certain combinations of dyes produce no complex, but allow the ions to coexist. In such a case, separation of the product can be prevented even when a basic solution is neutralized with an acidic solution, and different species of ions can be used, irrespective of their polarity.

Next, the polymer which decreases in solubility or dispersibility in an electrolytic solution when its pH is changed to form a thin film is described. Examples of these polymers include those having an ionic group (ionic polymers), described earlier.

It is essential for the above-described ionic polymer to be sufficiently soluble or dispersible in an aqueous liquid (including pH-adjusted aqueous liquid), and also to be sufficiently light-transmittable. It is preferable that the ionic polymer changes in its liquid nature from dissolved or dispersed condition to formation of precipitates below the supernatant liquid, when pH of the electrolytic solution in which it is dissolved or dispersed changes, within a pH range of 2. When a pH range is within 2, an image can be instantaneously separated, when the electrolytic solution rapidly changes in pH level as a result of passage of electricity, and other advantages can be expected, e.g., separation of a highly cohesive image, and reduced redissolution speed in the electrolytic solution. As a result, the filter layer produced is high in transparency and resistance to water.

When the pH range in which the ionic polymer changes in its liquid condition exceeds 2, some troubles will result, e.g., insufficient printing speed to give a good image structure, and decreased resistance of the image to water. It is more preferable that the pH range is 1 or less.

The ionic polymer is preferably the one having hydrophilic groups and hydrophobic groups which promotes insolubilization in water in a molecule. The hydrophobic group imparts to the polymer a function of instantaneously separating the film, in a concerted manner with the originally hydrophilic group which is transformed into a hydrophobic group as a result of the pH change. Moreover, the hydrophobic group has a function of adsorbing an organic pigment as the colorant, because of its high affinity for the pigment during the color filter producing method of the present invention, described later, and imparts to the polymer a good pigment-dispersing function.

For the polymer having both hydrophobic and hydrophilic groups, the number of the hydrophobic groups preferably accounts for 40% or more but 80% or less of the total number of the hydrophobic and hydrophilic groups. When the ratio is below 40%, the film formed tends to be redissolved in the solution, and resistance to water and strength of the film maybe insufficient. When the ratio is above 80%, on the other hand, solubility of the polymer in the aqueous liquid may be insufficient, possibly causing the electrolytic solution to become turbid, precipitation of the electrolysis substances and increased viscosity of the electrolytic solution. Thus, the ratio is preferably in the above range. The ratio is more preferably 55 to 70%, for improved separation efficiency and stabilized characteristics of the electrolytic solution.

The ionic polymer will have good film-making characteristics, when its acid number is in a range of 60 to 300, preferably 90 to 195. At below 60, it may not be well dissolved in an aqueous liquid, possibly causing problems, e.g., difficulty in increasing solid concentration of the electrolytic solution to a sufficient extent, making the liquid turbid and precipitated, and increased viscosity of the solution. At above 300, on the other hand, the film formed tends to be redissolved.

It is also necessary for the electrolytic solution dissolving the polymer to sharply change in precipitating condition with hydrogen ion concentration (pH) change, and exhibit the hysteresis characteristic of being difficult to be redissolved in the solution. These characteristics allow the thin film, once formed as a result of pH change of the solution, to keep itself intact, well prevented from being redissolved in the electrolytic solution.

The monomers having a hydrophobic group, for polymers useful for the present invention include those having an alkyl, styrene, α-methyl styrene, α-ethyl styrene, methyl methacrylate, butyl methacrylate, acrylonitrile, vinyl acetate, ethyl acrylate, butyl acrylate and lauryl methacrylate group, and derivatives thereof. Styrene and α-methyl styrene groups are particularly desirable for the hydrophilic monomers, because of their high hydrophilicity to produce a hysteresis in redissolution.

The water-soluble polymer useful for the present invention is polymer material obtained by copolymerizing molecules with such a hydrophilic group and those with a hydropholic group at the above-described ratio, where each of the hydrophilic and hydrophobic groups is not limited to one type. The polymer preferably has a degree of polymerization of 6,000 to 25,000 for film-making, more preferably 9,000 to 20,000. The polymer tends to be easily redissolved when its degree of polymerization is below 6,000. At above 25,000, on the other hand, the polymer will be dissolved in an aqueous liquid to an insufficient extent, possibly causing problems of the liquid becoming turbid or precipitation.

The polymer having both hydrophobic and hydrophilic groups in the molecule may be produced, for example, by copolymerizing a monomer having a hydrophilic group with the one having a hydrophobic group, preferably by random copolymerization. One or more types of groups may be used for each of the hydrophobic and hydrophilic groups.

The ionic polymer to be used for producing a color filter is preferably colorless or light in color.

The substances which can be made into a film by the method of the present invention include, in addition to the above-described ionic molecules, ionic polymers having an ionic group in the molecule, e.g., ionic dye and a mixture of the ionic dye and a pigment. The ionic dye for the present invention preferably decreases sharply in solubility or dispersibility in an electrolytic solution when its pH is changed.

The ionic dyes useful for the present invention include those based on triphenylmethane phthalide, phenothazine, phenothiazine, fluorecein, indolyl phthalide, spiropiran, azaphthalide, diphenylmethane, chromenopyrazole, Leucoauramine, azomethine, rhodamine lactam, naphtholactam, triazene, triazoleazo, thiazoleazo, azo, oxazine, thiazine, benzthiazoleazo, and quinone imine; and hydrophilic dyes, e.g., those having carboxyl, amino or imino group. Rose bengal and eosine as the fluorescein-based dyes are soluble in water at pH 4 or higher, but in a neutral condition at a lower pH level to precipitate. Similarly, Pro jet Fast Yellow 2 as a diazo-based dye is soluble in water at pH 6 or higher but precipitates at a lower pH level.

The film-making substance may be composed only of a colorant, when its solubility or dispersibility decreases, following pH change.

For the film-making substance, it is not necessary to be ionic in itself or to decrease in solubility by pH change of the electrolyte, so long as it is contained in the electrolytic solution for the present invention, after being incorporated with an ionic molecule, e.g., the above-described ionic polymer or dye. Such a substance is included in the ionic molecule when it is coagulated and separates out, to form a film. In other words, a mixture may be used to form a film, when at least one of its molecules shows in itself nature of decreasing in solubility by pH change to form a thin film.

A colorant, although essential for producing a color filter by the method of the present invention, is not necessary to show the above nature. For example, it may be dissolved or dispersed in an aqueous liquid together with an ionic polymer to form the electrolytic solution for the present invention, so long as the ionic polymer includes the colorant when it is coagulated and separates out to form a colored polymer film as it decreases in solubility following pH change of the electrolytic solution.

Moreover, the above-described ionic dye and/or pigment may be combined with an ionic polymer.

The pigment useful for the present invention is not limited, and known pigments of any color, e.g., red, green or blue, can be used. It is known that hue reproducibility tends to increase as pigment particle size decreases. When a color filter is produced, the pigment preferably has an average particle size of 200 nm or less for transparency and dispersibility of the color filter layer, more preferably 100 nm or less.

The colorants the inventors of the present invention have proposed as the ones suitable for photoelectrodeposition (Japanese Patent Application Nos. 9-268642 (1997) and 9-329798 (1997)) may be also used for producing a color filter.

Two or more colorants may be used to produce a mixed color.

Any combination of the above-described materials may be used as the film-making substance to be contained in the electrolytic solution for the present invention, so long as the thin film forming effect is not damaged. These combinations include a mixture of compounds of the same polarity, e.g., a mixture of anionic compounds, and a mixture of the compounds of different polarity such as a mixture of anionic and cationic compounds.

The substance to be contained in the electrolytic solution for the film-making method of the present invention is not limited to the one which decreases in solubility or dispersibility in an aqueous liquid when its pH is changed, so long as it can form a photocatalytic thin film by a photocatalytic reaction.

The electrolytic solution for the present invention may be incorporated with a supporting salt to increase its conductivity and thereby to improve separation efficiency. A supporting salt normally used for the electrochemical industry may be used. The salts useful for the present invention include alkaline metal salts, e.g., NaCl and KCl; tetraalkylammonium salts, e.g., tetraethylammonium perchlorate ($Et_4NClO_4$), tetramethylammonium perchlorate ($Me_4NClO_4$), tetraethylammonium chloride ($Et_4NCl$), tetramethylammonium chloride ($Me_4NCl$), tetra-n-butylammonium perchlorate (n-$Bu_4NClO_4$), tetraethylammonium bromide ($Et_4NBr$), tetra-n-butylammonium bromide (n-$Bu_4NBr$) and tetraethylammonium tetrafluorobromide ($Et_4NBF_4$); and halogen-based ammonium ions, e.g., $NH_4Cl$.

Of these salts, the alkaline metal salts cannot be used when a thin film is to be formed on the substrate provided with a thin-film transistor (TFT), because of their adverse effects on the TFT characteristics. In such a case, it is preferable to use a halogen-based ammonium ion, e.g., $NH_4Cl$; or tetraalkylammonium salts, e.g., $Me_4NCl$, $Me_4NClO_4$, n-$Bu_4NClO_4$, $Et_4NBF_4$, $Et_4NBF_4$ or n-$BU_4NBr$.

Formation of the thin film is naturally affected by pH level of the electrolytic solution. For example, the thin film formed in the electrolytic solution saturated with the film-making molecules is prevented from being redissolved in the solution. On the other hand, when a film is formed at the pH of the unsaturated solution, a film starts redissolution as soon as irradiation of light is stopped even if a film is formed. It is therefore necessary to keep the solution at a desired pH, at which it is saturated with the film-making molecules, using an acid or alkali.

An alkaline metal salt cannot be used when a thin film is to be formed on the substrate provided with a thin-film transistor (TFT), for the reason described above. In such a case, an organoalkaline substance, e.g., amine- or ammonia-based one, is used. Tetramethyl hydroxide is widely used as an etchant for photoresist, and particularly useful for the above purpose, because of its compatibility with a thin-film transistor.

The film-making method of the present invention for producing a color filter is described. For production of a color filter, a light-transmittable substrate (e.g., alkali-free glass substrate) is first provided with a light-transmittable conductive thin film, and then photocatalytic thin film in such a way that these films are in contact with each other. It is necessary, as described earlier for the film-making method, that the conductive film is allowed to conduct to the electrolytic solution. More concretely, the conductive film is partly exposed, or connected, when not exposed, to the electrode via a lead wire or the like. The conductive thin film may be provided to totally cover transparent the substrate surface, or in a pattern corresponding to that of the pixels of the color filter. The film-making substrate thus produced is immersed in an electrolytic solution for color filter production in such a way that the photocatalytic thin film is in contact with the solution and that the conductive thin film conducts to the solution.

It is preferable that the electrolytic solution for producing a color filter is incorporated with a colorant corresponding to the filter color, and that at least one of the components (including the colorant) of the film-making substance decreases in solubility or dispersibility in an aqueous liquid when its pH is changed. The substance to be contained in the electrolytic solution for the film-making method of the present invention is not limited to the one which decreases in solubility or dispersibility in an aqueous liquid when its pH is changed, so long as it can form a photocatalytic thin film by a photocatalytic reaction. At the same time, use of a film-making polymer is not prerequisite, as described above. However, its use is preferable for various reasons, e.g., strength of the color filter film.

It is particularly preferable to use an electrolytic solution incorporate with a polymer having an anionic group (e.g., carboxyl group) and colorant (e.g., pigment).

The color filter producing substrate, immersed in the electrolytic solution, is irradiated from the backside with ultraviolet light via a photomask corresponding to each color of the color filter layer. An adequate intensity of the ultraviolet light is 20 to 200 $mW/cm^2$.

The substrate is irradiated with ultraviolet light normally from the back side, because colorants generally absorb the ray, by which is meant that when it is irradiated from the front side, i.e., through the electrolytic solution, the ray will be absorbed by the colorant present in the solution. However, when the colorant used absorbs the ray little or only to a limited extent, the substrate may be irradiated from the front side.

A color filter is normally produced using an electrolytic solution for forming red, green and blue films, and the colored films are formed on the film-making substrate in this order.

Next, the method for forming a thin-film transistor (TFT) for driving liquid crystals and color filter on the same substrate is described. For producing a color filter, Japanese Patent Laid-Open No. 5-5874 discloses an electrodeposition method which uses a TFT-driving circuit to form a color filter layer of specific color on selected pixels. However, this method is unsuitable for producing a high-quality, TFT-assembled color filter, as discussed earlier. On the other hand, the film-making method of the present invention can form a specific colored film on selected pixels for the color filter using, e.g., a direct writing technique where a photomask and ultraviolet light laser are used to control the ultraviolet light irradiation area.

More concretely, a color filter producing substrate is produced by the common procedure by providing a TFT circuit for driving liquid crystals and light-transmittable pixel electrodes on a light-transmittable substrate, with a photocatalytic thin film on each pixel electrode. It is immersed in an electrolytic solution in such a way that at least the electrodes and photocatalytic films come into contact with the electrolytic solution, and irradiated with ultraviolet light which is directed onto a selected photocatalytic film to form a colored film thereon. It is essential not to completely cover each pixel electrode with the photocatalytic film but to leave part of each pixel electrode exposed to the electrolytic solution. "Part of each pixel electrode" should include its side. This procedure is repeated for all of the colored layer of multiple colors required, to form the color filter.

The method for producing a TFT-assembled color filter is described in more detail by referring to the drawings.

Figure 5:
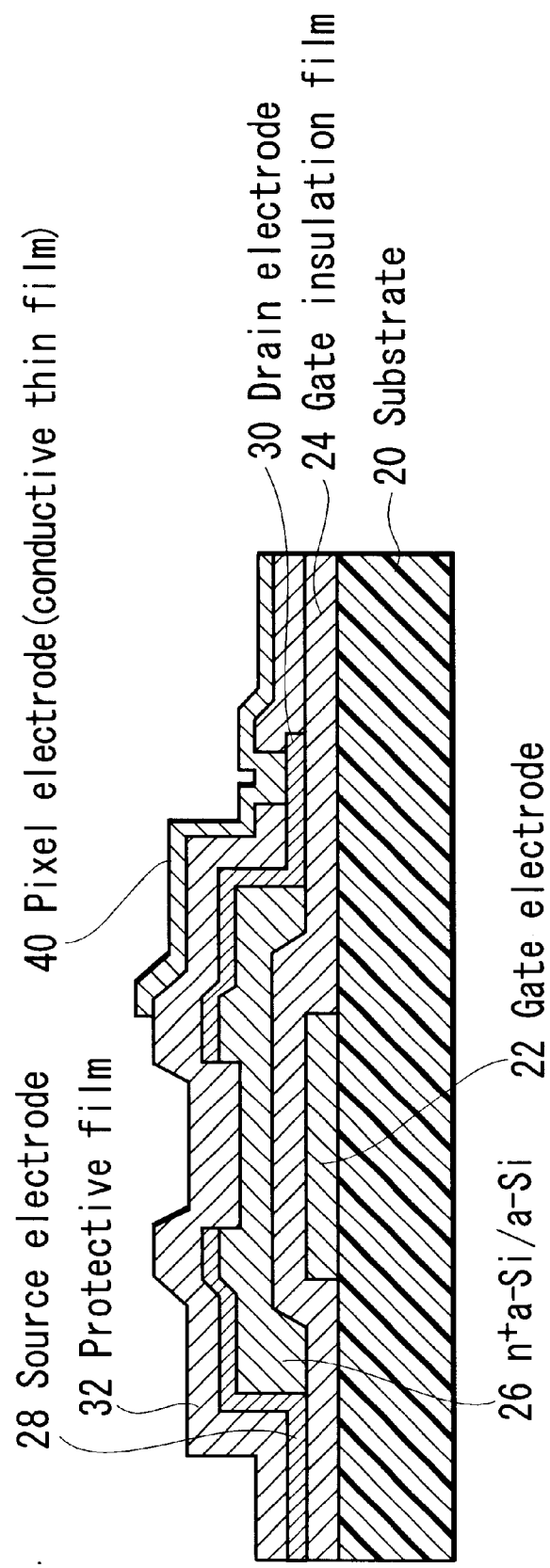
FIG. 5 shows a reverse-staggerd-channel-embedded TFT structure.

FIG. 5 shows the sectional structure of a reverse-stagger-channel-embedded TFT and pixel electrode provided on a substrate. This structure is now widely used for TFT, liquid-crystal displays.; wherein 20 is a light-transmittable substrate, 22 is a gate electrode, 24 is a gate insulation film, 26 is an $n^+$a-Si/a-Si, 28 is a source electrode, 30 is a drain electrode, 32 is a protective film, and 40 is a pixel electrode.

Figure 6:
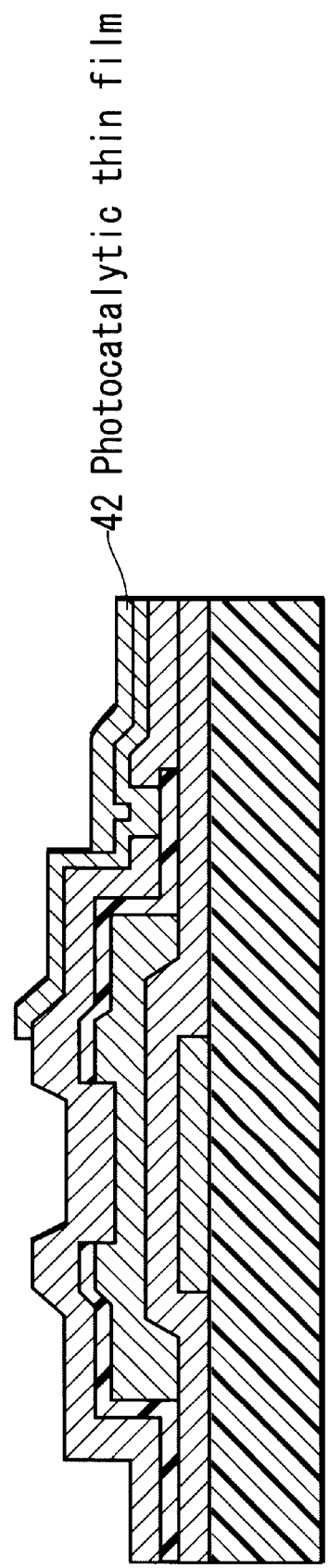
FIG. 6 shows a color filter producing substrate, with a pixel electrode which supports a photocatalytic thin film.

A photocatalytic thin film, e.g., thin film of titanium oxide, is set on the pixel electrode provided on the TFT-equipped substrate, to form the color filter producing substrate. This is shown in FIG. 6, wherein 42 is a photocatalytic thin film. As illustrated, the pixel electrode below the photocatalytic thin film is partly exposed. As described earlier, a TFT withstands up to around 250° C., and cannot be heated at higher temperature. This limits the titanium oxide film forming methods to sputtering, electron beam heating, and coating of the solution dispersed with fine particles of titanium oxide as the photocatalysis. Coating the pixel electrode with the solution is a simple method, and preferably used. The photocatalytic thin film is provided in a pattern on the pixel electrode by, e.g., the lift-off method, in which the substrate provided with the TFTs and pixel electrodes is covered with, e.g., a positive type photoresist layer over the entire surface, and then irradiated with light via a given photomask, the resist layer on the area of titanium oxide being thereafter removed by etching. The substrate is then coated with the solution for forming the titanium oxide film over the entire surface, and then the titanium oxide thin film formed in the area other than that for forming the titanium oxide is removed together with the resist layer.

Figure 7:
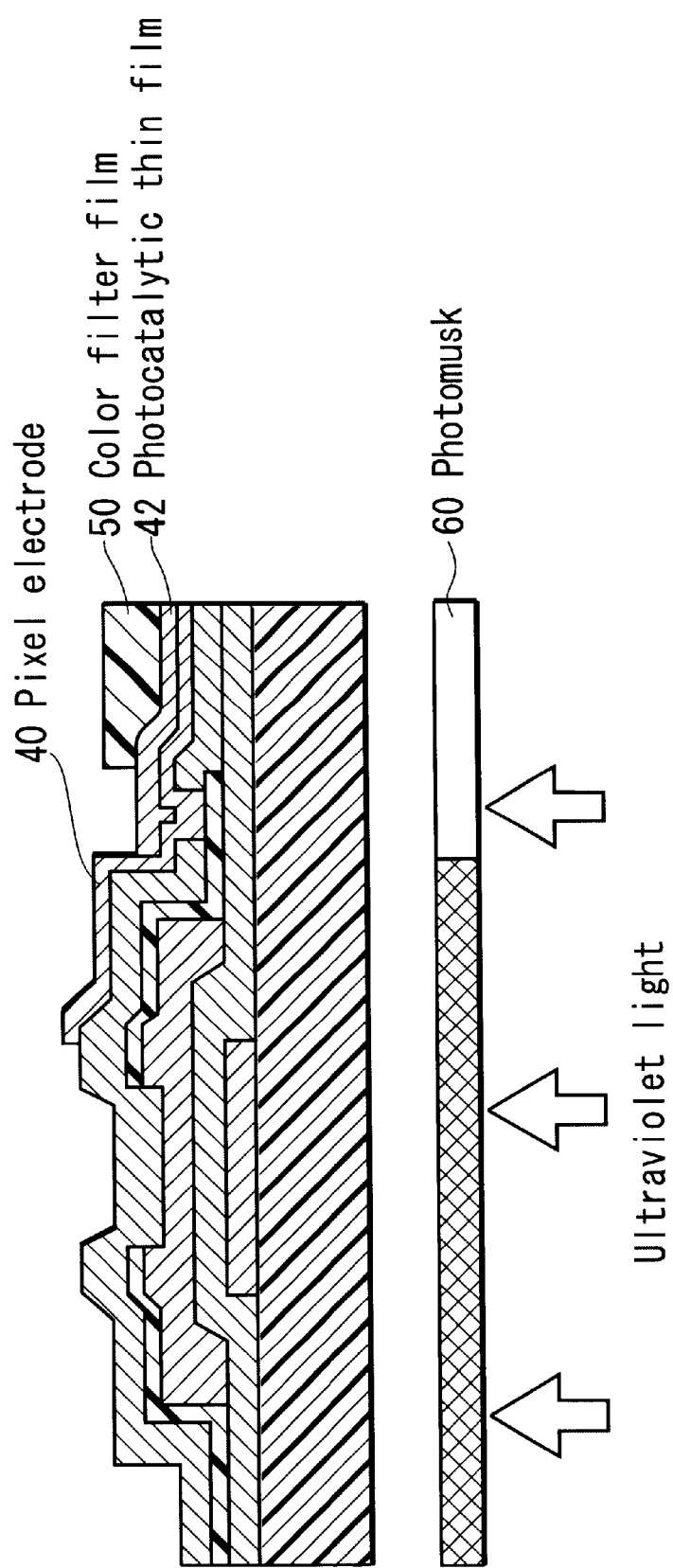
FIG. 7 shows the color filter film, produced by irradiating the substrate shown in FIG. 4 with ultraviolet light to trigger the photocatalytic reaction.

The color filter producing substrate thus produced is immersed in the electrolytic solution in such a way that at least the pixel electrodes and thin film of titanium oxide come into contact with the colorant-containing electrolytic solution. It is then irradiated with ultraviolet light from the back side onto the selected area. FIG. 7 shows one example of the irradiation of ultraviolet light onto the selected area via a photomask 60. The photocatalytic reaction occurs at the selected area of the titanium oxide thin film irradiated with ultraviolet light, to separate and form a colored film (color filter film) 50. This procedure is repeated by changing hue of the colorant present in the electrolytic solution one by one, to produce a color filter.

In the film-making method or color filter producing method of the present invention, it is preferable to irradiate the substrate with ultraviolet light onto the selected area via an image-focusing optical system or mirror reflection optical system, to form an image on the photocatalytic thin film. This gives a color filter with each pixel having sharp edges, because resolution of the filter is irrespective of substrate thickness. An exposure device which uses an image-focusing optical system or mirror reflection optical system is commonly referred to as a projection type exposure device.

Figure 8:
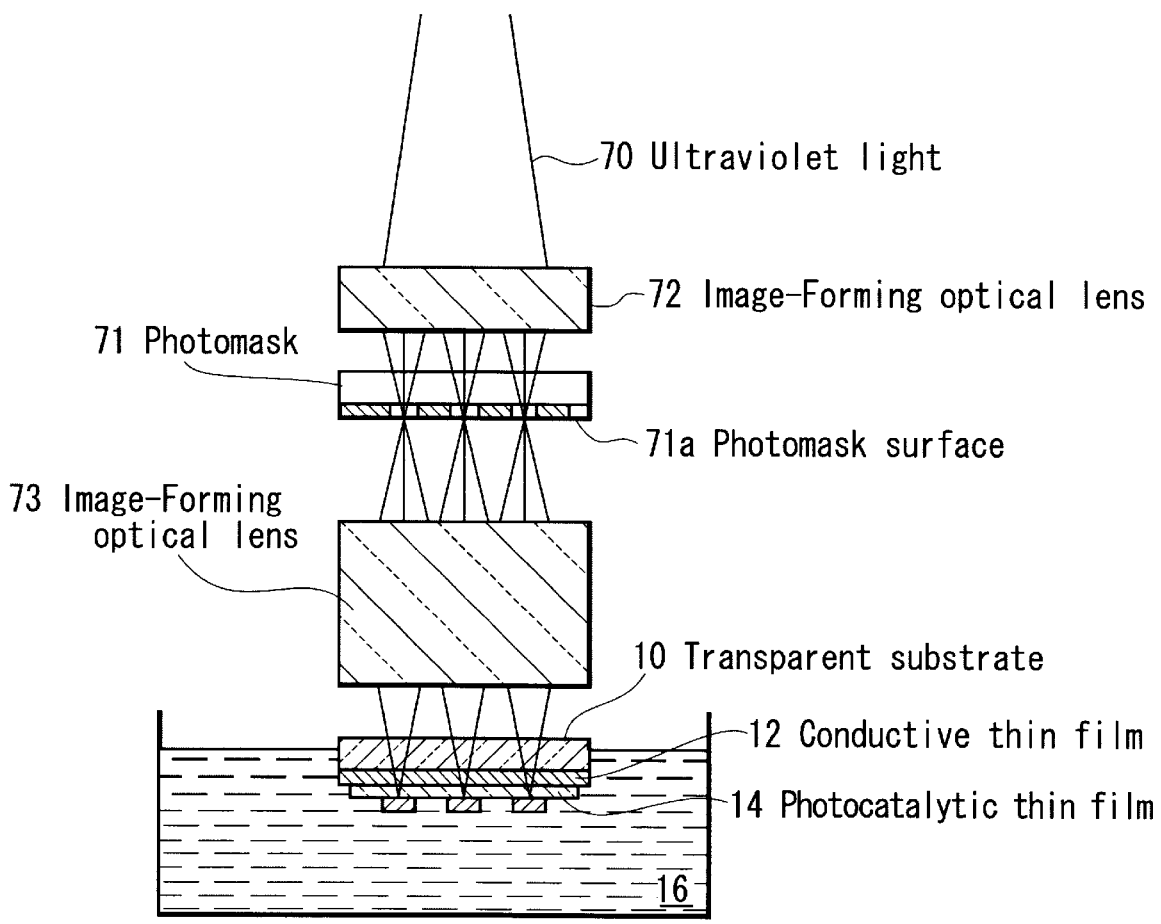
FIG. 8 shows one example of film-making apparatus (color filter producing apparatus) of the present invention.

A film-making apparatus which uses an image-focusing optical system is described by referring to FIG. 8. As shown in FIG. 8, a film-making substrate (or color filter producing substrate) comprises a transparent substrate 10 which supports a conductive thin film 12 and a photocatalytic thin film 14 in such a way that these thin films 12 and 14 come into contact with an electrolytic solution 16. An image-focusing optical system comprises two image-focusing optical lenses 72 and 73, and a photomask 71 is placed between these lenses 72 and 73. An image of ultraviolet light 70 is first formed by the image-focusing optical lens 72 on the photomask 71 (or more specifically on the photomask surface 71a).

The image of the incident ray (ultraviolet light) 70 then passes through the image-focusing optical lens 73, placed between the photomask 71 and substrate, to be formed on the photocatalytic thin film surface.

Distance between the image-focusing optical lens 73 and plane on which the image is formed (e.g., photocatalytic thin film surface) (hereinafter referred to as focal distance) is preferably at least thickness of the substrate, because the substrate is irradiated with light from its back side. On the other hand, increasing focal distance decreases resolution, and excessively long focal distance is undesirable for exposure device designs. For practical purposes, it is preferably in a range of 1 to 500 mm.

A projection type exposure device can have a deep focal depth of ±10 to ±100 μm, and hence form an image even when the substrate is bent or surface precision of the substrate is insufficient, allowing a color filter of clearness and high resolution to be produced stably. Focal depth is a range of depth in which spreading or blurring of irradiated light on the exposed plane is prevented.

A mirror projection type exposure device can be also used. It is a projection type device with image-focusing optical system replaced by a mirror reflection optical system.

It may be a commercial one.

It has an advantage in that it can use all of the wavelengths emitted from a light source, because it is free of chromatic aberration. It has another advantage in that distance between the reflection mirror plane and plane irradiated with light to form an image thereon (e.g., photosemiconductor thin film surface) can be freely designed, providing freedom of, e.g., arranging a substrate on an upper surface and irradiating light from its lower surface.

A mirror projection type exposure device can also have a deep focal depth of ±10 to ±100 μm, allowing an image to be formed relatively easily on the photosemiconductor thin film, even when the substrate is bent.

It is preferable that a black matrix is formed in a color filter. A black matrix normally needs an optical concentration of 2.5 or more, and no leakage of light should be secured.

The method for forming a black matrix is not limited. For example, a black matrix is formed by the common photolithography, where the substrate is coated with a black, negative photoresist, irradiated with ultraviolet light via a photomask for the black matrix, and etched to remove the photoresist not irradiated with ray, when it is to be formed before the colored film is formed. When it is to be formed after the colored film is formed, on the other hand, the surface on which the colored film is formed is totally coated with a black, negative photoresist, irradiated with light from the side opposite to the colored film, to form the black film selectively on the substrate area which transmits the light, and treated to remove the unset photoresist.

Moreover, the film-making method of the present invention can be used to form a black matrix. For example, a photocatalytic thin film is provided with a colored film by the photocatalytic reaction, brought into contact with an electrolytic solution containing a black pigment, with a conductive thin film conducting to the solution, and irradiated with ultraviolet light over the entire plane. This forms a black film (black matrix) on the area where no colored film is formed on the photocatalytic film.

The above-described photolithography can be used when a TFT-assembled color filter is produced.

One of the methods which dispense with photomask provides a light-transmittable substrate with TFTs and pixel electrodes, coats them with a black, positive photoresist, and irradiates the substrate with light from the side opposite to the TFTs and pixel electrodes. The electrodes for the TFTs shield light, to leave the black resist layer as the black matrix on the TFTs after the resist is removed. Afterward, a photocatalytic thin film is formed on each pixel electrode, to form a color filter film, as described earlier.

When a gate and source electrode are made of a low-refection metal film, e.g., two-layered Cr film, the electrodes and source line work as a black matrix, because these electrodes for a TFT circuit inherently shield light efficiently, dispensing with separately providing a black matrix. In this case, numerical aperture of the color filter can be increased to highest level, to make the liquid-crystal display device very bright and precision.

Figure 9:
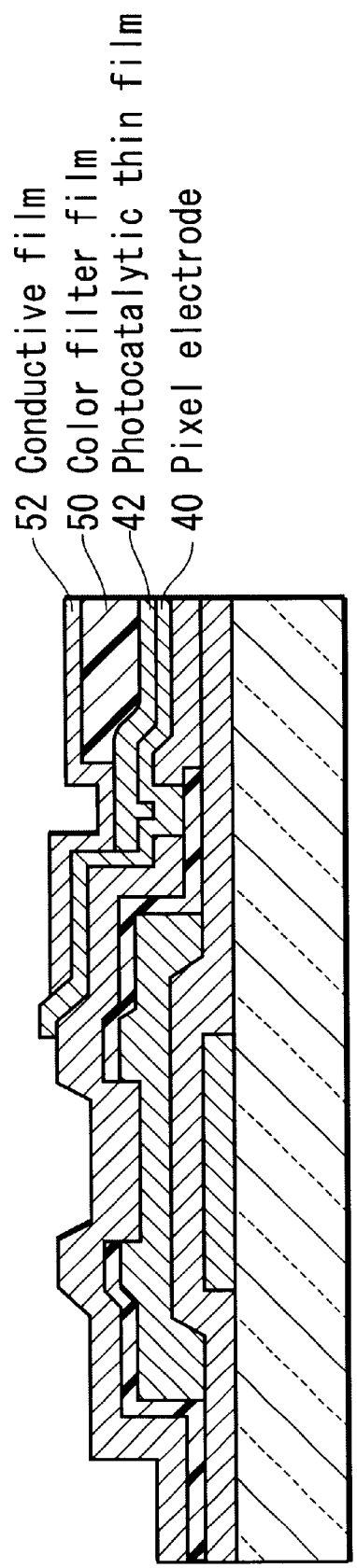
FIG. 9 shows a color filter, with the color filter film coated with an conductive film.

It is preferable to provide a light-transmittable, conductive film as the liquid-crystal display electrode on a color filter layer, because the colored film for a color filter is normally highly insulative. One example is illustrated in FIG. 9, wherein reference numeral 52 is an conductive film working as the liquid-crystal display electrode. It is formed in such a way to come into contact with the pixel electrode on the color filter producing substrate and to conduct to the drain electrode.

It is possible to impart electroconductivity to the color filter layer, instead of using a liquid-crystal display electrode. For example, an electrolytic solution for producing a color filter is dispersed with fine particles (approximately 10 Å in size) of a transparent, conductive substance, e.g., ITO or $SnO_2$, and used to form a film of high electroconductivity. These fine particles are incorporated in the solution at 5 to 50 wt. %, based on the solid, film-making substance, in the case of ITO.

The method of the present invention for producing a color filter can give the product of high numerical aperture and resolution at low cost, because it is based on the novel film-making method of the present invention. The TFT-assembled color filter produced by this method has another advantage, in addition to the above-described effects, of dispensing with alignment of the color filter with the TFT substrate, which is needed for the conventional color filter. Therefore, use of the color filter produced by the method of the present invention gives high-precision liquid-crystal display device at low cost.

Moreover, the film produced by the film-making method of the present invention contains no impurity, e.g., surfactant, unlike the electrodeposited film produced by the micelle electrolysis method, and hence is free of troubles, e.g., deteriorated color purity or transmittance.

The present invention also provides a film-making apparatus and color filter producing apparatus.

The film-making apparatus or color filter producing apparatus of the present invention is equipped with a light source which emits ultraviolet light, image-focusing optical system having a first image-focusing optical lens and second image-focusing optical lens, photomask put between the first and second image-focusing optical lenses, and electrolysis tank containing an electrolytic solution. The image-focusing optical system may be replaced by a mirror reflection optical system. The film-making apparatus or color filter producing apparatus of the present invention, which uses an image-focusing optical system, is outlined in FIG. 8. As shown in FIG. 8, the substrate for film-making or for producing a color filter is put in the electrolysis tank.

The film-making apparatus or color filter producing apparatus of the present invention needs no electrodeposition apparatus or separate electrode for electrodeposition, and hence gives a high-quality film or color filter film simply and at low cost.

The present invention also relates to a color filter, comprising a light-transmittable substrate which supports a light-transmittable conductive thin film, colored film and photocatalytic thin film, wherein the photocatalytic thin film is arranged in such a way that it is in contact with the conductive film while partly exposing it, and the colored film is formed on the photocatalytic thin film.

Figure 10:
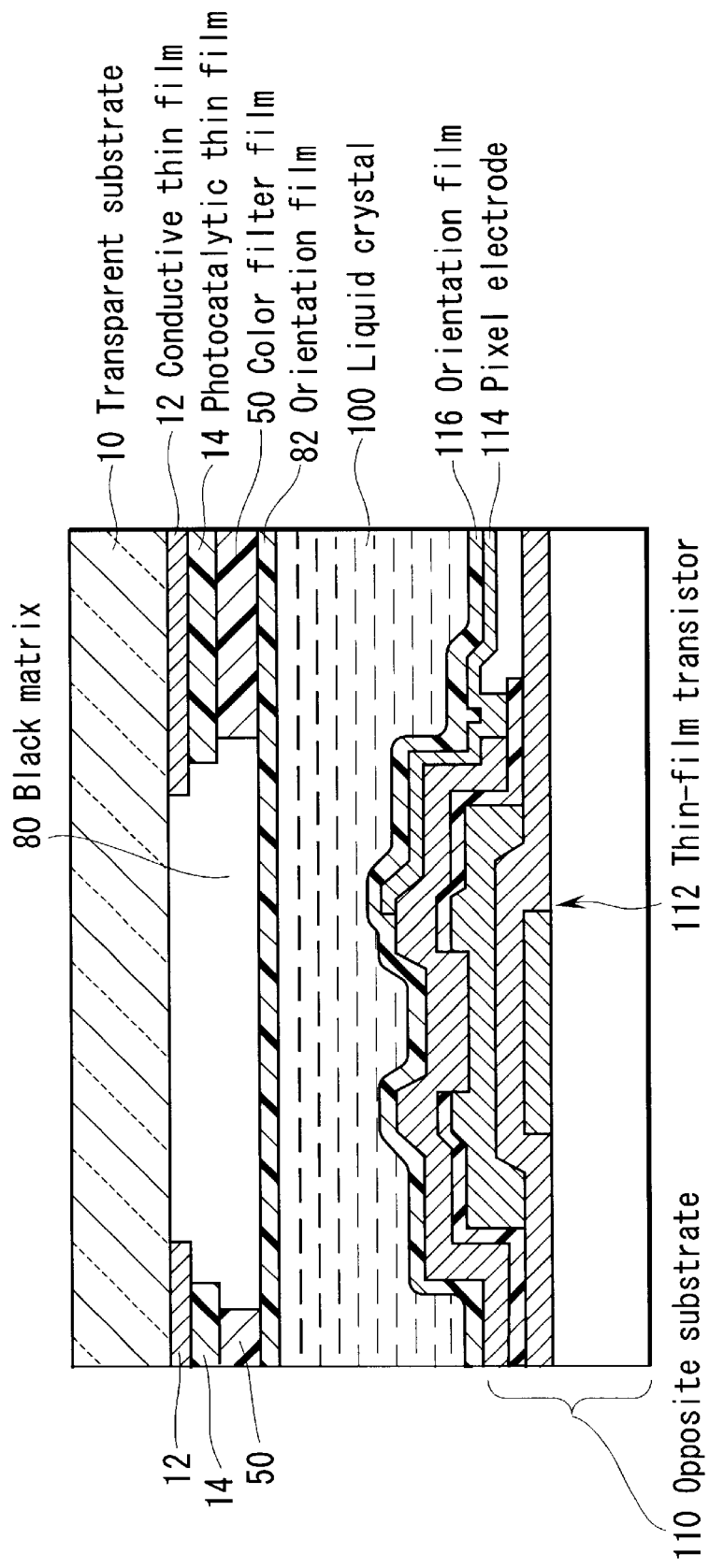
FIG. 10 shows one example of the liquid-crystal display of the present invention.

The present invention also relates to a liquid-crystal display, at least equipped with the above color filter, a substrate facing the color filter, supporting thin-film transistors and pixel electrodes, and liquid-crystalline substance sealed between the color filter and substrate. One example of the liquid-crystal display is shown in FIG. 10, wherein a color filter comprises a glass substrate 10 which supports conductive thin films 12 in a pattern corresponding to that of pixel electrodes, photocatalytic thin films 14, colored films 50 (color filter films) and black matrices 80, and oriented film 82, in this order, each of the photocatalytic thin films 14 being arranged in such a way to partly expose the corresponding conductive thin film 12. The color filter faces an opposite substrate 110, which supports thin-film transistors 112, pixel electrodes 114 and oriented films 116, in this order, with a liquid crystal 100 being sealed between the color filter and opposite substrate 110.

EXAMPLES

The present invention is described more concretely by Examples, which by no means limit the present invention.

Example 1
<Preparation of Substrate for Liquid-crystal Display>

A 0.7 mm thick alkali-free glass substrate (Corning, 1737 glass) was totally coated with a 0.1 μm thick, transparent, conductive film of ITO. The ITO film was coated with Bistorater L settable at low temperature (Nippon Soda, NDC100C) in such a way to partly expose the ITO film, and dried at 70° C., to form a 0.5 μm thick titanium oxide thin film thereon. This was used as the substrate for liquid-crystal display.

<Preparation of Red-colored Film>

The above substrate for liquid-crystal display was immersed in an electrolytic solution (pH: 7.8, conductivity: 10 mS/cm) dispersed with a styrene-acrylate copolymer (molecular weight: 13,000, hydrophobic groups/ (hydrophobic and hydrophilic groups) molar ratio: 65%, acid number: 150) and ultrafine particles of a red-color pigment (resin/pigment solid wt. ratio: 0.7) at a solid content of 10 wt. %, in such a way that at least the ITO thin film and titanium oxide thin film came into contact with the electrolytic solution. The substrate was irradiated with deep UV ray (intensity: 50 mW/cm$^2$) for 1 min. from the back side (ITO film side) via a photomask for the red filter. The light source used was a Hg-Xe lamp (Yamashita Denso, 1 KW) uniformly emitting light. The red-colored film was formed only on the area irradiated with light. The substrate was washed with pure water.

<Preparation of Green-colored Film>

The above substrate with the red-colored film was immersed in an electrolytic solution (pH: 7.8, conductivity: 10 mS/cm) dispersed with a styrene-acrylate copolymer (molecular weight: 13,000, hydrophobic groups/ (hydrophobic and hydrophilic groups) molar ratio: 65%, acid number: 150) and ultrafine particles of a phthalocyanine green pigment (resin/pigment solid wt. ratio: 0.5) at a solid content of 10 wt. %, in a manner similar to that for preparing the red-colored film. It was irradiated with the same deep UV ray under the same conditions via a photomask for the green filter. The green-colored film was formed only on the area irradiated with light. The substrate was washed with pure water.

<Preparation of Blue-colored Film>

The above substrate was immersed in an electrolytic solution (pH: 7.8, conductivity: 10 mS/cm) dispersed with a styrene-acrylate copolymer (molecular weight: 13,000, hydrophobic groups/(hydrophobic and hydrophilic groups) molar ratio: 65%, acid number: 150) and ultrafine particles of a phthalocyanine blue pigment (resin/pigment solid wt. ratio: 0.7) at a solid content of 10 wt. %, in a manner similar to that for preparing the red-colored film. It was irradiated with the same deep UV ray under the same conditions via a photomask for the blue filter. The blue-colored film was formed only on the area irradiated with light. The substrate was washed with pure water.

The above steps produced the color filter with the red-, green- and blue-colored films.

<Preparation of Black Matrix>

The above substrate with colored films was immersed in an electrolytic solution (pH: 7.8, conductivity: 10 mS/cm) dispersed with a styrene-acrylate copolymer (molecular weight: 13,000, hydrophobic groups/(hydrophobic and hydrophilic groups) molar ratio: 65%, acid number: 150) and ultrafine particles of a carbon black pigment (resin/pigment solid wt. ratio: 0.7) at a solid content of 10 wt. %, in a manner similar to that for preparing the red-colored film. It was irradiated with the same deep UV ray under the same conditions over the entire substrate. The black-colored film (black matrix) was formed on the area on which no colored film was formed. The substrate was washed with pure water.

Example 2

<Preparation of Substrate for Liquid-crystal Display>

A 0.7 mm thick, alkali-free glass substrate (Corning, 1737 glass) was coated with a 0.1 μm thick, transparent, conductive film of ITO, in a pattern corresponding to those of the red, green and blue pixels for the color filter by photolithography. The patterned ITO film was coated with 0.5 μm thick patterned titanium oxide thin film by the lift-off method, in such a way to partly expose the ITO film.

<Preparation of Red-colored Film>

The above substrate for liquid-crystal display was immersed in an electrolytic solution (pH: 7.8, conductivity: 10 mS/cm) dispersed with a styrene-acrylate copolymer (molecular weight: 13,000, hydrophobic groups/ (hydrophobic and hydrophilic groups) molar ratio: 65%, acid number: 150) and ultrafine particles of a red-color pigment (resin/pigment solid wt. ratio: 0.7) at a solid content of 10 wt. %, in such a way that at least the ITO thin film and titanium oxide thin film came into contact with the electrolytic solution. The substrate was irradiated with deep UV ray (intensity: 50 mW/cm$^2$) for 1 min. from the back side (ITO film side) via a photomask for the red filter. The light source used was a Hg-Xe lamp (Yamashita Denso, 1 KW) uniformly emitting light. The red-colored film was formed only on the area irradiated with light. The substrate was washed with pure water.

<Preparation of Green-colored Film>

The above substrate with the red-colored film was immersed in an electrolytic solution (pH: 7.8, conductivity: 10 mS/cm) dispersed with a styrene-acrylate copolymer (molecular weight: 13,000, hydrophobic groups/ (hydrophobic and hydrophilic groups) molar ratio: 65%, acid number: 150) and ultrafine particles of a phthalocyanine green pigment (resin/pigment solid wt. ratio: 0.5) at a solid content of 10 wt. %, in a manner similar to that for preparing the red-colored film. It was irradiated with the same deep UV ray under the same conditions via a photomask for the green filter. The green-colored film was formed only on the area irradiated with light. The substrate was washed with pure water.

<Preparation of Blue-colored Film>

The above substrate was immersed in an electrolytic solution (pH: 7.8, conductivity: 10 mS/cm) dispersed with a styrene-acrylate copolymer (molecular weight: 13,000, hydrophobic groups/(hydrophobic and hydrophilic groups) molar ratio: 65%, acid number: 150) and ultrafine particles of a phthalocyanine blue pigment (resin/pigment solid wt. ratio: 0.7) at a solid content of 10 wt. %, in a manner similar to that for preparing the red-colored film. It was irradiated with the same deep UV ray under the same conditions via a photomask for the blue filter. The blue-colored film was formed only on the area irradiated with light. The substrate was washed with pure water.

The above steps produced the color filter with the red-, green- and blue-colored films.

<Preparation of Black Matrix>

The above substrate with colored films was totally coated with a UV-settable resin containing carbon black, and irradiated with ultraviolet light from the back side, i.e., the side not coated with the resin containing carbon black. The black, UV-settable resin sets only in the area which transmits ultraviolet light through the glass substrate. The UV-settable resin on the other area was washed off by acetone.

Example 3

<Preparation of Substrate for Liquid-crystal Display>

A 0.7 mm thick, alkali-free glass substrate (Corning, 1737 glass) was provided with thin-film transistors (TFTs) and pixel electrodes (transparent, conductive films of ITO) by the conventional method (refer to FIG. 1). The gate and source electrodes for the TFT were made of a two-layered Cr film, to allow the electrodes and source line to work as a black matrix, after the color filter layer was formed.

Then, a titanium oxide thin film was formed by the lift-off method only on each pixel electrode surface, where the titanium oxide coating solution was that of Bistorater L settable at low temperature (Nippon Soda, NDC100C). The substrate was totally coated with the coating solution and dried at 70° C., where each pixel electrode was partly exposed, as shown in the figure, so that it was partly in contact with the electrolytic solution. This exposed area was used to have a through-hole in the transparent electrode and TFT on the colored film, after the film was formed (the same procedure was used for preparation of the substrate for liquid-crystal display in Examples 4 and 5).

<Preparation of Red-colored Film>

The above substrate for liquid-crystal display was immersed in an electrolytic solution (pH: 7.8, conductivity: 10 mS/cm) dispersed with a styrene-acrylate copolymer (molecular weight: 13,000, hydrophobic groups/ (hydrophobic and hydrophilic groups) molar ratio: 65%, acid number: 150) and ultrafine particles of a red-color pigment (resin/pigment solid wt. ratio: 0.7) at a solid content of 10 wt. %, in such a way that at least the ITO thin film and titanium oxide thin film came into contact with the electrolytic solution. The substrate was irradiated with deep UV ray (intensity: 50 mW/cm$^2$) for 1 min. from the back side (ITO film side) via a photomask for the red filter. The light source used was a Hg-Xe lamp (Yamashita Denso, 1 KW) uniformly emitting light. The red-colored film was formed only on the area irradiated with light. The substrate was washed with pure water.

<Preparation of Green-colored Film>

The above substrate with the red-colored film was immersed in an electrolytic solution (pH: 7.8, conductivity:

10 mS/cm) dispersed with a styrene-acrylate copolymer (molecular weight: 13,000, hydrophobic groups/ (hydrophobic and hydrophilic groups) molar ratio: 65%, acid number: 150) and ultrafine particles of a phthalocyanine green pigment (resin/pigment solid wt. ratio: 0.5) at a solid content of 10 wt. %, in a manner similar to that for preparing the red-colored film. It was irradiated with the same deep UV ray under the same conditions via a photomask for the green filter. The green-colored film was formed only on the area irradiated with light. The substrate was washed with pure water.

<Preparation of Blue-colored Film>

The above substrate was immersed in an electrolytic solution (pH: 7.8, conductivity: 10 mS/cm) dispersed with a styrene-acrylate copolymer (molecular weight: 13,000, hydrophobic groups/(hydrophobic and hydrophilic groups) molar ratio: 65%, acid number: 150) and ultrafine particles of a phthalocyanine blue pigment (resin/pigment solid wt. ratio: 0.7) at a solid content of 10 wt. %, in a manner similar to that for preparing the red-colored film. It was irradiated with the same deep UV ray under the same conditions via a photomask for the blue filter. The blue-colored film was formed only on the area irradiated with light. The substrate was washed with pure water.

Finally, a transparent electrode of ITO was formed on the color filter layer, and allowed to conduct to the transparent electrode of ITO which was opened beforehand.

The above steps produced the full-color, TFT-assembled color filter with the red-, green- and blue-colored films on the given pixel electrodes. The gate and source electrodes for the TFT were made of two-layered Cr film, dispensing with separately providing a black matrix, because the electrodes and source line sufficiently worked as the black matrix.

Example 4

<Preparation of Substrate for Liquid-crystal Display and Black Matrix>

A 0.7 mm thick, alkali-free glass substrate (Corning, 1737 glass) was provided with thin-film transistors (TFTs) and pixel electrodes (transparent, conductive films of ITO) by the conventional method (refer to FIG. 1).

The above substrate for liquid-crystal display was coated with a black, positive photoresist, and irradiated with light from the side opposite to the TFTs and pixel electrodes, and etched to selectively remove the black, positive photoresist on the area irradiated with light, to expose the pixel electrodes. This procedure formed the black matrix.

Then, a titanium oxide thin film was formed by the lift-off method only on each pixel electrode surface, where the titanium oxide coating solution was that of Bistorater L settable at low temperature (Nippon Soda, NDC100C). The substrate was totally coated with the coating solution and dried at 70° C., where each pixel electrode was partly exposed, as shown in the figure, so that it was partly in contact with the electrolytic solution.

<Preparation of Red-colored Film>

The above substrate for liquid-crystal display was immersed in an electrolytic solution (pH: 7.8, conductivity: 10 mS/cm) dispersed with a styrene-acrylate copolymer (molecular weight: 13,000, hydrophobic groups/ (hydrophobic and hydrophilic groups) molar ratio: 65%, acid number: 150) and ultrafine particles of a red-color pigment (resin/pigment solid wt. ratio: 0.7) at a solid content of 10 wt. %, in such a way that at least the ITO thin film and titanium oxide thin film came into contact with the electrolytic solution. The substrate was irradiated with deep UV ray (intensity: 50 mW/cm$^2$) for 1 min. from the back side (ITO film side) via a photomask for the red filter. The light source used was a Hg-Xe lamp (Yamashita Denso, 1 KW) uniformly emitting light. The red-colored film was formed only on the area irradiated with light. The substrate was washed with pure water.

<Preparation of Green-colored Film>

The above substrate with the red-colored film was immersed in an electrolytic solution (pH: 7.8, conductivity: 10 mS/cm) dispersed with a styrene-acrylate copolymer (molecular weight: 13,000, hydrophobic groups/ (hydrophobic and hydrophilic groups) molar ratio: 65%, acid number: 150) and ultrafine particles of a phthalocyanine green pigment (resin/pigment solid wt. ratio: 0.5) at a solid content of 10 wt. %, in a manner similar to that for preparing the red-colored film. It was irradiated with the same deep UV ray under the same conditions via a photomask for the green filter. The green-colored film was formed only on the area irradiated with light. The substrate was washed with pure water.

<Preparation of Blue-colored Film>

The above substrate was immersed in an electrolytic solution (pH: 7.8, conductivity: 10 mS/cm) dispersed with a styrene-acrylate copolymer (molecular weight: 13,000, hydrophobic groups/(hydrophobic and hydrophilic groups) molar ratio: 65%, acid number: 150) and ultrafine particles of a phthalocyanine blue pigment (resin/pigment solid wt. ratio: 0.7) at a solid content of 10 wt. %, in a manner similar to that for preparing the red-colored film. It was irradiated with the same deep UV ray under the same conditions via a photomask for the blue filter. The blue-colored film was formed only on the area irradiated with light. The substrate was washed with pure water.

Finally, a transparent electrode of ITO was formed on the color filter layer, and allowed to conduct to the transparent electrode of ITO which was opened beforehand.

The above steps produced the full-color, TFT-assembled color filter with the red-, green- and blue-colored films as well as a black matrix layer on the given pixel electrodes.

Example 5

<Preparation of Substrate for Liquid-crystal Display>

A 0.7 mm thick, alkali-free glass substrate (Corning, 1737 glass) was provided with thin-film transistors (TFTs) and pixel electrodes (transparent, conductive films of ITO) by the conventional method (refer to FIG. 1). The gate and source electrodes for the TFT were made of a two-layered Cr film, to allow the electrodes and source line to work as a black matrix, after the color filter layer was formed.

Then, a titanium oxide thin film was formed by the lift-off method only on each pixel electrode surface, where the titanium oxide coating solution was that of Bistorater L settable at low temperature (Nippon Soda, NDC100C). The substrate was totally coated with the coating solution and dried at 70° C., where each pixel electrode was partly exposed, as shown in the figure, so that it was partly in contact with the electrolytic solution.

<Preparation of Red-colored Film>

The above substrate for liquid-crystal display was immersed in an electrolytic solution (pH: 7.8, conductivity: 10 mS/cm) dispersed with a styrene-acrylate copolymer (molecular weight: 13,000, hydrophobic groups/ (hydrophobic and hydrophilic groups) molar ratio: 65%, acid number: 150) and ultrafine particles of a red-color pigment (resin/pigment solid wt. ratio: 0.7) at a solid content of 10 wt. %, in such a way that at least the ITO thin film and titanium oxide thin film came into contact with the electrolytic solution. The substrate was irradiated with deep UV ray (intensity: 50 mW/cm$^2$) for 1 min. from the back side (ITO film side) via a photomask for the red filter. The light source used was a Hg-Xe lamp (Yamashita Denso, 1 KW) uniformly emitting light. The red-colored film was formed only on the area irradiated with light. The substrate was washed with pure water.

<Preparation of Green-colored Film>

The above substrate with the red-colored film was immersed in an electrolytic solution (pH: 7.8, conductivity: 10 mS/cm) dispersed with a styrene-acrylate copolymer (molecular weight: 13,000, hydrophobic groups/ (hydrophobic and hydrophilic groups) molar ratio: 65%, acid number: 150) and ultrafine particles of a phthalocyanine green pigment (resin/pigment solid wt. ratio: 0.5) at a solid content of 10 wt. %, in a manner similar to that for preparing the red-colored film. It was irradiated with the same deep UV ray under the same conditions via a photomask for the green filter. The green-colored film was formed only on the area irradiated with light. The substrate was washed with pure water.

<Preparation of Blue-colored Film>

The above substrate was immersed in an electrolytic solution (pH: 7.8, conductivity: 10 mS/cm) dispersed with a styrene-acrylate copolymer (molecular weight: 13,000, hydrophobic groups/(hydrophobic and hydrophilic groups) molar ratio: 65%, acid number: 150) and ultrafine particles of a phthalocyanine blue pigment (resin/pigment solid wt. ratio: 0.7) at a solid content of 10 wt. %, in a manner similar to that for preparing the red-colored film. It was irradiated with the same deep UV ray under the same conditions via a photomask for the blue filter. The blue-colored film was formed only on the area irradiated with light. The substrate was washed with pure water.

The above steps produced the full-color, TFT-assembled color filter with the red-, green- and blue-colored films as well as a black matrix layer on the given pixel electrodes.

<Preparation of Black Matrix>

The above substrate with colored films was totally coated with a UV-settable resin containing carbon black, and irradiated with ultraviolet light from the back side, i.e., the side not coated with the resin containing carbon black. The black, UV-settable resin sets only in the area which transmits ultraviolet light through the glass substrate. The UV-settable resin on the other area was washed off by acetone.

Finally, a transparent electrode of ITO was formed on the color filter layer, and allowed to conduct to the transparent electrode of ITO which was opened beforehand.

The above steps produced the full-color, TFT-assembled color filter with the red-, green- and blue-colored films as well as a black matrix layer on the given pixel electrodes. This color filter shields light more efficiently, because of the TFT gate and drain electrodes also working as the black matrix.

Example 6

<Preparation of Substrate for Liquid-crystal Display>

A 0.7 mm thick, alkali-free glass substrate (Corning, 1737 glass) was provided with thin-film transistors (TFTs) and pixel electrodes (transparent, conductive films of ITO) by the conventional method (refer to FIG. 1). The gate and source electrodes for the TFT were made of a two-layered Cr film, to allow the electrodes and source line to work as a black matrix, after the color filter layer was formed.

Then, a titanium oxide thin film was formed by the lift-off method only on each pixel electrode surface, where the titanium oxide coating solution was that of Bistorater L settable at low temperature (Nippon Soda, NDC100C). The substrate was totally coated with the coating solution and dried at 70° C., where each pixel electrode was partly exposed, as shown in the figure, so that it was partly in contact with the electrolytic solution.

<Preparation of Red-colored Film>

The above substrate for liquid-crystal display was immersed in an electrolytic solution (pH: 7.8, conductivity: 10 mS/cm) dispersed with a styrene-acrylate copolymer (molecular weight: 13,000, hydrophobic groups/ (hydrophobic and hydrophilic groups) molar ratio: 65%, acid number: 150),ultrafine particles of a red-color pigment, and ultrafine particles of ITO (particle size: aproximately 50 nm) in a resin/pigment/ITO solid wt. ratio of 1/1/1 at a solid content of 10 wt. %, in such a way that at least the ITO thin film and titanium oxide thin film came into contact with the electrolytic solution. The substrate was irradiated with deep UV ray (intensity: 50 mW/cm$^2$) for 1 min. from the back side (ITO film side) via a photomask for the red filter. The light source used was a Hg-Xe lamp (Yamashita Denso, 1 KW) uniformly emitting light. The red-colored film was formed only on the area irradiated with light. The substrate was washed with pure water.

<Preparation of Green-colored Film>

The above substrate with the red-colored film was immersed in an electrolytic solution (pH: 7.8, conductivity: 10 mS/cm) dispersed with a styrene-acrylate copolymer (molecular weight: 13,000, hydrophobic groups/ (hydrophobic and hydrophilic groups) molar ratio: 65%, acid number: 150), ultrafine particles of a phthalocyanine green pigment, and ultrafine particles of ITO (particle size: aproximately 50 nm) in a resin/pigment/ITO solid wt. ratio of 1/1/1 at a solid content of 10 wt. %, in a manner similar to that for preparing the red-colored film. It was irradiated with the same deep UV ray under the same conditions via a photomask for the green filter. The green-colored film was formed only on the area irradiated with light. The substrate was washed with pure water.

<Preparation of Blue-colored Film>

The above substrate was immersed in an electrolytic solution (pH: 7.8, conductivity: 10 mS/cm) dispersed with a styrene-acrylate copolymer (molecular weight: 13,000, hydrophobic groups/(hydrophobic and hydrophilic groups) molar ratio: 65%, acid number: 150), ultrafine particles of a phthalocyanine blue pigment, and ultrafine particles of ITO (particle size: aproximately 50 nm) in a resin/pigment/ITO solid wt. ratio of 1/1/1 at a solid content of 10 wt. %, in a manner similar to that for preparing the red-colored film. It was irradiated with the same deep UV ray under the same conditions via a photomask for the blue filter. The blue-colored film was formed only on the area irradiated with light. The substrate was washed with pure water.

The above steps produced the full-color, TFT-assembled color filter with the red-, green- and blue-colored films as well as a black matrix layer on the given pixel electrodes.

The color filter has a higher conductivity, because of the fine, transparent, conductive particles of ITO dispersed in the color filter layer, to control voltage drop more efficiently while the liquid-crystal display is in service. Therefore, this color filter needs no additional conductive film on its colored film.

Example 7

The color filter prepared by Example 2 was coated with an oriented film of polyimide by the conventional method, to form the filter substrate. A TFT matrix substrate, comprising a glass substrate which supported thin-film transistors and pixel electrodes, was similarly coated with an oriented film of polyimide, to form the opposite substrate. The matrix and opposite substrates were placed one on another via a spacer to form a gap between them, which was filled with a liquid crystal to form the liquid-crystal display device (refer to FIG. 10).

The film-making method of the present invention needs neither electrodeposition apparatus nor separate electrode for electrodeposition, and hence gives a film by a simple apparatus and at a low cost. The film prepared by this method is of high quality, on a level with the one prepared by photoelectrodeposition in quality, and uniformity because no external voltage is applied during the process of making colored films.

The method of the present invention for producing a color filter, being based on the novel film-making method of the present invention, can give a color filter of high numerical aperture and resolution at a low cost. The method for producing a TFT-assembled color filter has another advantage of dispensing with the step for aligning the color filter with the TFT, which is needed by the conventional method. Therefore, use of the color filter of the present invention allows producing a liquid-crystal display device of high accuracy at a low cost.

The color filter producing apparatus of the present invention needs neither electrodeposition apparatus nor separate electrode for electrodeposition, and hence can be simplified in structure.

What is claimed is:

1. A film-making method, wherein a film-making substrate comprising a light-transmittable substrate which supports a light-transmittable conductive thin film and a photocatalytic thin film is contacted with an electrolytic solution and irradiated with ultraviolet light onto the photocatalytic thin film to form a film thereon, the conductive film and the photocatalytic film being arranged on the film-making substrate in order to contact with each other, to allow the conductive film to conduct to the electrolytic solution, and to make contact the photocatalytic film with the electrolytic solution, and the electrolytic solution containing a substance which decreases in solubility or dispersibility in an aqueous liquid when pH value of the electrolytic solution is changed.

2. The film-making method according to claim 1, wherein the photocatalytic thin film is provided on the film-making substrate in order to partly expose the conductive thin film, to allow the conductive thin film to conduct to the electrolytic solution, when the photocatalytic thin film comes into contact with the solution.

3. The film-making method according to claim 1, wherein the conductive thin film is connected to an electrode on the film-making substrate, and the electrode is brought into contact with the electrolytic solution, to allow the conductive film to conduct to the electrolytic solution.

4. A method for producing a color filter, comprising a step of irradiating a substrate, contacted with an electrolytic solution, with ultraviolet light, wherein the substrate comprises a light-transmittable support which supports a light-transmittable conductive thin film and a photocatalytic thin film to make contact with each other, to allow the conductive film to conduct to the electrolytic solution, and to make contact the photocatalytic thin film with the electrolytic solution, the electrolytic solution containing a colorant and a substance which decreases in solubility or dispersibility in an aqueous liquid when pH of the electrolytic solution is changed, and the ultraviolet light being directed onto a selected region on the photocatalytic thin film to form a colored film thereon.

5. The method for producing a color filter according to claim 4, wherein the photocatalytic thin film is provided on the substrate in order to partly expose the conductive thin film, to allow the conductive thin film to conduct to the electrolytic solution, when the photocatalytic thin film comes into contact with the solution.

6. The method for producing a color filter according to claim 4, wherein the conductive thin film is connected to an electrode on the substrate, and the electrode is brought into contact with the electrolytic solution, to allow the conductive thin film to conduct to the electrolytic solution.

7. The method for producing a color filter according to claim 4, wherein the conductive thin film and the photocatalytic thin film are formed in a pattern corresponding to required pixels of the color filter.

8. The method for producing a color filter according to claim 4, wherein the ultraviolet light is directed onto the selected region through a photomask.

9. The method for producing a color filter according to claim 4, wherein an image-focusing optical system is put between a photomask and the substrate, to form an image of ultraviolet light on the photocatalytic thin film.

10. The method for producing a color filter according to claim 4, wherein an image-focusing optical lens of an image-focusing optical system and the light-transmittable support are set 1 mm to 50 cm apart from each other.

11. The method for producing a color filter according to claim 4, wherein an image-focusing optical system has a focal depth of $\pm 10$ to $\pm 100$ $\mu$m.

12. The method for producing a color filter according to claim 4, wherein a mirror reflection optical system is put between a photomask and the substrate, to form an image of ultraviolet light on the photocatalytic thin film.

13. The method for producing a color filter according to claim 4, wherein the photocatalytic thin film contains titanium oxide.

14. The method for producing a color filter according to claim 4, wherein the substance which decreases in solubility or dispersibility in an aqueous liquid has carboxyl group therein.

15. The method for producing a color filter according to claim 4, wherein the substance which decreases in solubility or dispersibility in an aqueous liquid is a polymer.

16. The method for producing a color filter according to claim 15, wherein the polymer is a copolymer of a monomer having a hydrophobic group and a monomer having a hydrophilic group, the number of the hydrophobic groups accounting for 40% or more but 80% or less of the total number of the hydrophobic and hydrophilic groups.

17. The method for producing a color filter according to claim 4, wherein pH level of the electrolytic solution is adjusted by a pH adjustor which has substantially no or less adverse effect on the film-making characteristics.

18. The method for producing a color filter according to claim 4, wherein conductivity of the electrolytic solution is adjusted by a salt which has substantially no or less adverse effect on the film-making characteristics.

19. The method for producing a color filter according to claim 4, wherein temperature of the electrolytic solution is controlled.

20. The method for producing a color filter according to claim 4, wherein the electrolytic solution contains fine particles of a light-transmittable, conductive substance.

21. The method for producing a color filter according to claim 4, wherein a black matrix is formed by photolithography process which uses a black photoresist, before the colored film is formed.

22. The method for producing a color filter according to claim 4, wherein after forming the colored film, a surface on which the colored film is formed is coated with a black, UV-settable resin, the light-transmittable support is irradiated with ultraviolet light from the side opposite to the colored film, and a portion of the resin which is not set by the irradiation is removed, to form a black matrix.

23. The method for producing a color filter according to claim 4, wherein the substance which decreases in solubility or dispersibility in an aqueous liquid when pH of the electrolitic solution is changed is a polymer having a carboxyl group, and the colorant is a pigment.

24. The method for producing a color filter according to claim 4, wherein the polymer is a copolymer of a monomer having a hydrophobic group and a monomer having a hydrophilic group, the number of the hydrophobic groups accounting for 40% or more but 80% or less of the total number of the hydrophobic and hydrophilic groups.

25. A method for producing a color filter, comprising a step of irradiating a substrate, contacted with an electrolytic solution, with ultraviolet light, wherein the substrate comprises a light-transmittable support which supports a light-transmittable conductive thin film and a photocatalytic thin film in order to make contact with each other, to allow the conductive thin film to conduct to the electrolytic solution, and to make contact the photocatalytic thin film with the electrolytic solution, the electrolytic solution containing a colorant and a substance which decreases in solubility or dispersibility in an aqueous liquid when pH of the electrolytic solution is changed, and the ultraviolet light being directed onto a selected region on the photocatalytic thin film to form a colored film thereon, the step being repeated once or more after changing the colorant each time for the electrolytic solution.

26. A method for producing a thin-film transistor type color filter, comprising a step of irradiating a substrate, contacted with an electrolytic solution, with ultraviolet light, wherein the substrate comprises a light-transmittable support which supports a thin-film transistor, light-transmittable pixel electrodes, and a photocatalytic thin film, arranged so as to make contact the photocatalytic thin film with the electrodes while partly exposing the electrodes, and to make contact at least the electrodes and the photocatalytic thin film with the electrolytic solution, the electrolytic solution containing a colorant and a substance which decreases in solubility or dispersibility in an aqueous liquid when pH of the electrolytic solution is changed, and the ultraviolet light being directed onto a selected region on the photocatalytic film to form a colored film thereon.

27. The method for producing a color filter according to claim 26, wherein the thin-film transistor has gate and drain electrodes, and each of the gate and drain electrodes is formed with a low reflection material, for providing functions similar to those of a black matrix.

28. The method for producing a color filter according to claim 27, wherein each of the gate and drain electrodes is composed of two- or three-layered Cr.

29. The method for producing a color filter according to claim 26, further comprising a light-transmittable conductive thin film formed on the colored film, the conductive thin film is conduct to the pixel electrodes.

30. A method for producing a thin-film transistor type color filter, comprising a step of irradiating a color filter producing substrate, contacted with an electrolytic solution, with ultraviolet light, wherein the substrate comprises a light-transmittable support which supports a thin-film transistor, light-transmittable pixel electrodes, and a photocatalytic thin film, arranged so as to make contact the photocatalytic thin film with the electrodes while partly exposing the electrodes, and to make contact at least the electrodes and the photocatalytic thin film with the electrolytic solution, the electrolytic solution containing a colorant and a substance which decreases in solubility or dispersibility in an aqueous liquid when pH of the electrolitic solution is changed, and the ultraviolet light being directed onto a selected region on the photocatalytic thin film to form a colored film thereon, the step being repeated once or more after changing the colorant each time for the electrolytic solution.

31. A method for producing a thing-film transistor type a color filter, comprising steps of:
    forming a substrate provided with a thin-film transistor, and light-transmittable pixel electrodes supported by a light-transmittable support; coating the substrate with a black, positive photoresist; irradiating the substrate with light from the side opposite to the thin-film transistor and light-transmittable pixel electrodes; removing the positive photoresist at a portion where irradiated with light; and providing a photocatalytic thin film contacting with the electrodes while partly exposing the electrodes;
    contacting the color filter producing substrate in an electrolytic solution containing a colorant and a substance which decreases in solubility or dispersibility in an aqueous liquid when pH of the electrolitic solution is changed, in order to make contact at least the electrodes and photocatalytic film with the electrolytic solution;
    irradiating the substrate with ultraviolet light onto a selected region on the photocatalytic thin film to form a colored film thereon; and
    repeating the foregoing steps once or more after changing the colorant each time for the electrolytic solution.

32. A film-making method, wherein a film-making substrate comprising a light-transmittable support which supports a light-transmittable conductive thin film and a photocatalytic thin film is contacted with an electrolytic solution, and irradiated with ultraviolet light onto the photocatalytic thin film to form a film thereon, the conductive thin film and photocatalytic thin film are arranged in order to make contact with each other, to allow the conductive film to conduct to the electrolytic solution, and to make contact the photocatalytic thin film with the electrolytic solution, and the electrolytic solution containing a substance that may turn into film by photocatalytic reactions.

33. A method for producing a color filter, comprising a step of irradiating a substrate, contacted with an electrolytic solution, with ultraviolet light, wherein the substrate comprises a light-transmittable support which supports a light-transmittable conductive thin film and a photocatalytic thin film in order to make contact with each other, to allow the conductive film to conduct to the electrolytic solution, and to make contact the photocatalytic thin film with the electrolytic solution, the electrolytic solution containing a colorant and a substance that may turn into film by photocatalytic reactions, and the ultraviolet light being directed onto a selected region on the photocatalytic thin film to form a colored film thereon.

34. A film-making apparatus, equipped with a light source which emits ultraviolet light, an image-focusing optical system having a first image-focusing optical lens and second image-focusing optical lens, a photomask provided between the first and second image-focusing optical lenses, and an electrolysis tank containing an electrolytic solution, wherein a film-making substrate is placed in the electrolysis tank, the film-making substrate comprising a light-transmittable support which supports a light-transmittable conductive thin film and a photocatalytic thin film in order to make contact with each other, and to allow the conductive film to conduct to the electrolytic solution.

35. An apparatus for producing a color filter, equipped with a light source which emits ultraviolet light, an image-focusing optical system having a first image-focusing optical lens and second image-focusing optical lens, a photomask provided between the first and second image-focusing optical lenses, and an electrolysis tank containing an electrolytic solution, wherein a substrate, comprising a light-transmittable support which supports a thin-film transistor, light-transmittable pixel electrodes and a photocatalytic thin film, is placed in the electrolysis tank in order to make contact at least the electrodes and photocatalytic thin film with the electrolytic solution, the photocatalytic thin film being arranged so as to contact with the electrodes while partly exposing the electrodes.

36. A color filter substrate, comprising a light-transmittable support which supports a light-transmittable conductive thin film, a colored film and a photocatalytic thin film, wherein the photocatalytic thin film is arranged so as to contact with the conductive thin film while partly exposing the conductive thin film, and the colored film is formed on the photocatalytic thin film.

37. A liquid-crystal display, at least equipped with the color filter substrate according to claim 36, an opposite substrate facing the color filter substrate and a liquid-crystalline substance sealed between the color filter substrate and the opposite substrate.

38. A film-making apparatus comprising:
   means for supporting a film-making substrate comprising a light-transmittable substrate and a light-transmittable conductive thin film;
   means for contacting a photocatalytic thin film with an electrolytic solution; and
   means for irradiating the electrolytic solution with ultraviolet light to form a film on the photocatalytic thin film,
   wherein the photocatalytic thin film, the conductive film and electrolytic solution are brought into contact with each other, and the electrolytic solution contains a substance which decreases in solubility or dispersibility in an aqueous liquid when pH value of the electrolytic solution is changed.

39. An apparatus for producing a color filter comprising
   means for irradiating a substrate, which comprises a light-transmittable support that supports a light-transmittable conductive thin film and a photocatalytic thin film in contact with each other, in contact with an electrolytic solution with ultraviolet light; and
   means for directing the ultraviolet light to a selected region on the photocatalytic thin film to form a colored film thereon,
   wherein the electrolytic solution contains a colorant and a substance which decreases in solubility or dispersibility in an aqueous liquid when pH value of the electrolytic solution is changed.

40. A film-making apparatus, equipped with a light source which emits ultraviolet light, a mirror reflection optical system, and an electrolysis tank containing an electrolytic solution, wherein a film-making substrate is placed in the electrolysis tank, the film-making substrate comprising a light-transmittable support which supports a light-transmittable conductive thin film and a photocatalytic thin film in order to make contact with each other, and to allow the conductive film to conduct to the electrolytic solution.

41. An apparatus for producing a color filter, equipped with a light source which emits ultraviolet light, a mirror reflection optical system, and an electrolysis tank containing an electrolytic solution, wherein a substrate, comprising a light-transmittable support which supports a thin-film transistor, light-transmittable pixel electrodes and a photocatalytic thin film, is placed in the electrolysis tank in order to make contact at least the electrodes and photocatalytic thin film with the electrolytic solution, the photocatalytic thin film being arranged so as to contact with the electrodes while partly exposing the electrodes.

* * * * *